(12) United States Patent
Bala et al.

(10) Patent No.: US 12,207,108 B2
(45) Date of Patent: Jan. 21, 2025

(54) POWER SAVING SIGNAL OPERATIONS

(71) Applicant: InterDigital Patent Holdings, Inc., Wilmington, DE (US)

(72) Inventors: Erdem Bala, East Meadow, NY (US); Paul Marinier, Brossard (CA); Moon-il Lee, Melville, NY (US); Dylan Watts, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 352 days.

(21) Appl. No.: 17/635,113

(22) PCT Filed: Aug. 12, 2020

(86) PCT No.: PCT/US2020/045950
§ 371 (c)(1),
(2) Date: Feb. 14, 2022

(87) PCT Pub. No.: WO2021/030448
PCT Pub. Date: Feb. 18, 2021

(65) Prior Publication Data
US 2022/0303795 A1 Sep. 22, 2022

Related U.S. Application Data

(60) Provisional application No. 62/909,143, filed on Oct. 1, 2019, provisional application No. 62/886,175, filed on Aug. 13, 2019.

(51) Int. Cl.
*H04W 24/04* (2009.01)
*H04B 7/06* (2006.01)
(Continued)

(52) U.S. Cl.
CPC .......... *H04W 24/04* (2013.01); *H04B 7/0695* (2013.01); *H04W 24/08* (2013.01); *H04W 52/0229* (2013.01)

(58) Field of Classification Search
CPC . H04W 24/04; H04W 24/08; H04W 52/0229; H04B 7/0695; Y02D 30/70
See application file for complete search history.

(56) References Cited

U.S. PATENT DOCUMENTS

2018/0084446 A1 3/2018 Li et al.
2018/0227899 A1 8/2018 Yu et al.
(Continued)

FOREIGN PATENT DOCUMENTS

CN 107534466 A 1/2018
CN 108702180 A 10/2018
(Continued)

OTHER PUBLICATIONS

3rd Generation Partnership Project (3GPP), TS 38.213 V15.4.0, "Technical Specification Group Radio Access Network, NR, Physical Layer Procedures for Control (Release 15)", Dec. 2018, pp. 1-104.
(Continued)

*Primary Examiner* — The Hy Nguyen
*Assistant Examiner* — Jesse P. Samluk
(74) *Attorney, Agent, or Firm* — Condo Roccia Koptiw LLP

(57) ABSTRACT

A wireless transmit/receive unit (WTRU) may determine a first set of beams and a second set of beams, that a respective quality of each beam in the first set of beams is less than a predetermined quality value, and that a beam that is in the second set of beams and not in the first set of beams has a quality that is equal to or greater than the predetermined quality value. The WTRU may select the beam that is in the second set of beams and not in the first set of beams and
(Continued)

whose quality is equal to or greater than the predetermined quality value, for a BFR and send a message that indicates the selected beam for the BFR to abase station (e.g., a gNodeB). The WTRU may receive a message comprising the selected beam from the gNodeB.

17 Claims, 9 Drawing Sheets

(51) Int. Cl.
*H04W 24/08* (2009.01)
*H04W 52/02* (2009.01)

(56) References Cited

U.S. PATENT DOCUMENTS

| | | | |
|---|---|---|---|
| 2019/0053321 | A1 | 2/2019 | Nazmul et al. |
| 2019/0059056 | A1 | 2/2019 | Nazmul et al. |
| 2019/0059129 | A1 | 2/2019 | Luo et al. |
| 2019/0081688 | A1 | 3/2019 | Deenoo et al. |
| 2019/0200248 | A1 | 6/2019 | Basu et al. |
| 2019/0245737 | A1 | 8/2019 | Zhou et al. |
| 2019/0387470 | A1 | 12/2019 | Nam et al. |
| 2020/0275523 | A1* | 8/2020 | Zhang ............. H04B 7/0695 |
| 2021/0099263 | A1* | 4/2021 | Cheng ............. H04B 7/0695 |
| 2022/0264460 | A1* | 8/2022 | Seo ............. H04W 52/0216 |

FOREIGN PATENT DOCUMENTS

| | | | |
|---|---|---|---|
| CN | 108702767 A | 10/2018 | |
| CN | 110933725 A | 3/2020 | |
| WO | WO-2018129300 A1 * | 7/2018 | ........... H04B 7/0695 |

OTHER PUBLICATIONS

3rd Generation Partnership Project (3GPP), TS 38.321 V15.4.0, "Technical Specification Group Radio Access Network, NR, Medium Access Control (MAC) Protocol Specification (Release 15)", Dec. 2018, pp. 1-77.

3rd Generation Partnership Project (3GPP), TS 38.331 V15.4.0, "Technical Specification Group Radio Access Network, NR, Radio Resource Control (RRC) Protocol Specification (Release 15)", Dec. 2018, pp. 1-474.

3rd Generation Partnership Project (3GPP), TS 38.211 V15.4.0, "Technical Specification Group Radio Access Network, NR, Physical Channels and Modulation (Release 15)", Dec. 2018, pp. 1-96.

3rd Generation Partnership Project (3GPP), TS 38.212 V15.4.0, "Technical Specification Group Radio Access Network, NR, Multiplexing and Channel Coding (Release 15)", Dec. 2018, pp. 1-100.

3rd Generation Partnership Project (3GPP), R1-1907438, "Latency Analysis of SCell BFR Solutions", Ericsson, 3GPP TSG-RAN WG1 Meeting #97 Reno, USA, May 13-17, 2019, pp. 1-4.

3rd Generation Partnership Project, 3GPP R2-1906709, "Cross cell group power management in MR-DC", 3GPP TSG-RAN WG2 Meeting #106, Qualcomm Inc., MediaTek, Huawei, Reno, USA, May 13-17, 2019, 3 pages.

* cited by examiner

POWER SAVING SIGNAL OPERATIONS

CROSS-REFERENCE TO RELATED APPLICATIONS

This application is the National Stage Entry under 35 U.S.C. § 371 of Patent Cooperation Treaty Application No. PCT/2020/045950, filed Aug. 12, 2020, which claims the benefit of U.S. Provisional Application No. 62/886,175, filed Aug. 13, 2019, and U.S. Provisional Application No. 62/909,143, filed Oct. 1, 2019, the contents of which are incorporated by reference herein.

BACKGROUND

Mobile communications using wireless communication continue to evolve. A fifth generation of mobile communication may be referred to as 5G. A previous (e.g., legacy) generation of mobile communication may be, for example, fourth generation (4G) long term evolution (LTE).

SUMMARY

Systems, methods, and instrumentalities are described herein for power saving signal operations. Power saving signal operations may include beam failure detection (e.g., beam failure wake up signal (BF-WUS) detection) and beam failure recovery (BFR) operations (e.g., WUS-BFR operations). In examples, a wireless transmit/receive unit (WTRU) may include a processor configured (e.g., programmed with executable instructions to implement a method) to determine a first set of beams and a second set of beams; determine that a respective quality of each beam in the first set of beams is less than a predetermined quality value, determine that a beam that is in the second set of beams and not in the first set of beams has a quality that is equal to or greater than the predetermined quality value; select the beam that is in the second set of beams and not in the first set of beams and whose quality is equal to or greater than the predetermined quality value, for a BFR; send a message that indicates the selected beam for the BFR to a gNB; and receive a message comprising the selected beam from the gNB.

The first set of beams and the second set of beams may not overlap. The first set of beams may be a subset of the second set of beams.

The respective quality of a (e.g., each) beam in the first set of beams may be determined, for example, during a first time period. The quality of the beam that is in the second set of beams and not in the first set of beams may be determined, for example, during a second time period. In examples, the second time period may be subsequent to the first time period. In examples, the first time period and the second time period may overlap in time.

The message received from the gNB may comprise, for example, a reconfiguration message that indicates the selected beam is to be included in the first set of beams.

A WTRU processor may be further configured with executable instructions to implement a method to, further: monitor the first set of beams for a type of signal. The beam failure recovery may be for a beam failure in association with monitoring for the type of signal. The beam failure may differ from a radio link failure associated with using the first set of beams.

A WTRU processor may be further configured with executable instructions to implement the method to, further: monitor for a WUS using the first set of beams before a discontinuous reception (DRX)-on; and monitor a physical downlink control channel transmission during the DRX-on using the second set of beams. The first set of beams may be a subset of the second set of beams.

The BFR may comprise a WUS-BFR. A WTRU processor may be further configured with executable instructions to implement a method to, further: skip decoding of the WUS in the WUS-BFR and monitor for the WUS using the selected beam based on the message received from the gNB.

One or more examples herein may be implemented (e.g., in whole or in part), for example, by one or more devices, apparatuses, and/or systems (e.g., a WTRU, a network node such as a gNodeB (gNB), and/or the like), which may comprise one or more processors configured to execute methods (e.g., in whole or in part) as computer executable instructions that may be stored on a computer readable medium or a computer program product, that, when executed by the one or more processors, performs the methods. The computer readable medium or the computer program product may comprise instructions that cause one or more processors to perform the methods by executing the instructions.

A wireless transmit/receive unit (WTRU) may be configured to (e.g., dynamically) detect a control resource set (CORESET) and/or transmission configuration indicator (TCI) state for a wakeup signal. A wakeup signal (WUS) may also be referred to as a power saving signal (PSS). For example, the WTRU may dynamically detect a CORESET and/or TCI state for a WUS, for example, based on the CORESET configuration of an associated ON-duration. The CORESET in which a PSS is transmitted (e.g., CORESET_PSS) may be determined, for example, based on one or more configured parameter(s) of a CORESET with a configured on duration and/or search spaces configured in the associated ON-duration. A WTRU may determine the TCI state of a CORESET_PSS, for example, based on one or more configured parameter(s) of the CORESET_ON(s) and/or the search spaces configured for the associated ON-duration.

A WTRU, e.g., during some periods, may be allowed to not to monitor for a WUS. A WTRU may be configured to not monitor for a WUS while in certain states, for example, to avoid misinterpretation/misdetection of signals as a WUS. A WTRU may enter wake-up state and may not monitor for a WUS while it is not in a wake-up state. A WTRU may be configured to stay in a wake-up state regardless whether a WUS has been received. A WTRU may be configured to ignore WUSs under various conditions, for example, when the WTRU is not in a wake-up state.

A certain type of signal (e.g., aWUS) may be used and may be associated with beam failure detection and/or recovery. A WTRU may measure a beam quality of one or more beam reference signals associated with configured CORESETs. A WTRU may determine that a beam may have failed, for example, if the beam measurement quality is below a threshold. The WTRU may determine a preferred beam if a beam measurement quality for the preferred beam is above the threshold. For example, a WTRU may perform WUS monitoring using a subset of beams in a set of beams used for monitoring a physical downlink control channel (PDCCH). A WTRU may detect a beam failure for the WUS monitoring (BF-WUS) based on a failure of all beams in the subset of beams. A WTRU may identify (e.g., based on a quality threshold) at least one beam (e.g., not configured for WUS) in the set of beams and not in the subset of beams as at least one preferred beam for WUS beam failure recovery (BFR). The WTRU may request the WUS-BFR by informing a network node about the BF-WUS and by indicating the at least one preferred beam for the WUS-BFR. A WTRU may receive reconfigured WUS beams (e.g., including the at least one preferred beam) from the network node for the WUS BFR.

A WTRU may be configured to resolve inconsistent signaling between information derived from a wake-up signal and cross-slot scheduling information and/or scheduling downlink control information (DCI). In an example, a PSS may include additional information for a WTRU. A PSS may indicate to a WTRU, for example, if the WTRU implements cross-slot scheduling. A PSS may indicate to the WTRU, for example, if the WTRU switches from a bandwidth part (BWP) to another BWP.

A WTRU may be configured to operate in a cross-slot scheduling mode. A WTRU may be configured to operate according to a power saving state. In examples, a WTRU may be configured to operate according to one or more (e.g., a set of) power saving states. A power saving state may indicate that certain entries of a time division relay access (TDRA) table are excluded. For example, a WTRU in a given power saving state may determine that certain TDRA table(s) may not be utilized for data scheduling.

Multiple input multiple output (MIMO) adaptation may be performed, for example, per BWP and/or based on the BWP being used. For example, a number of antenna ports to use for transmission and/or reception may be determined per BWP. The number of bits used in an antenna ports field of a DCI may be different, for example depending on the BWP to which it applies, for example, if the number of antenna ports is determined per BWP. A WTRU may be configured to interpret the antenna ports field of a DCI, for example, based on the BWP to which the DCI applies.

A WTRU may be configured with one or more power saving signal(s)/wake-up signal(s) offset(s) for short discontinuous reception (DRX). Offset indication(s) may be implicit, for example, associated with search space configuration. Offset configuration(s) may be explicit.

DETAILED DESCRIPTION

Figure 1A:
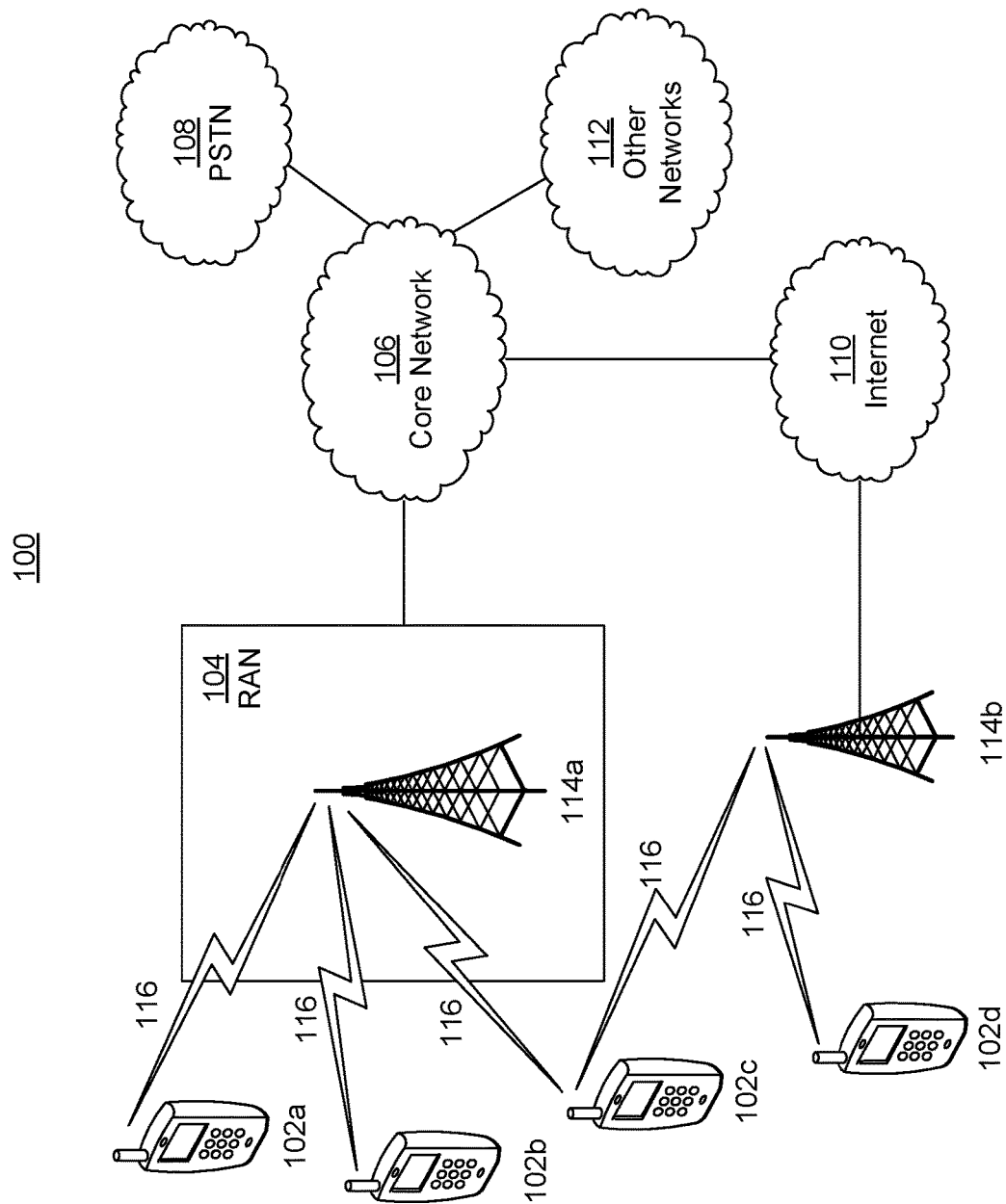
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
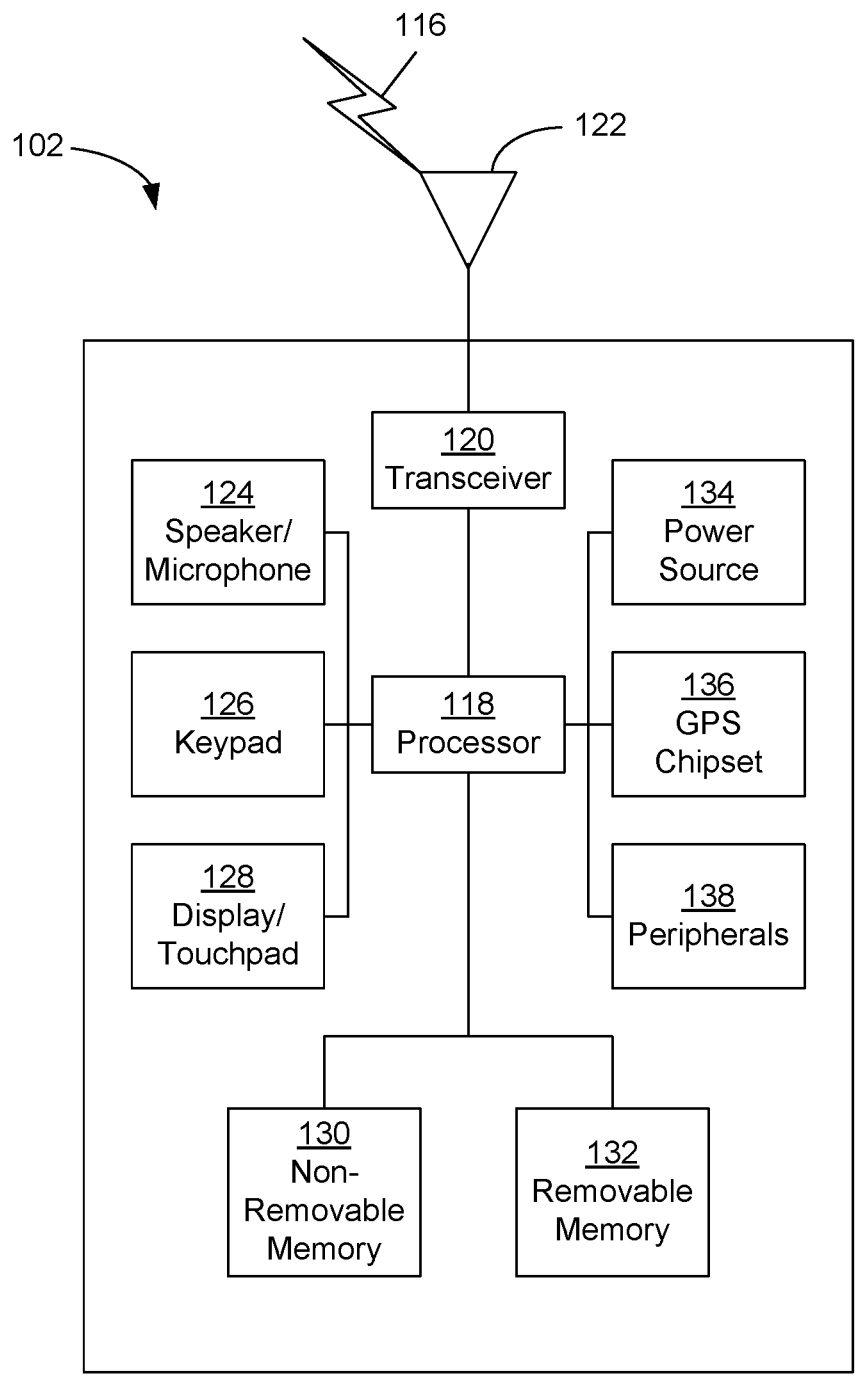
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
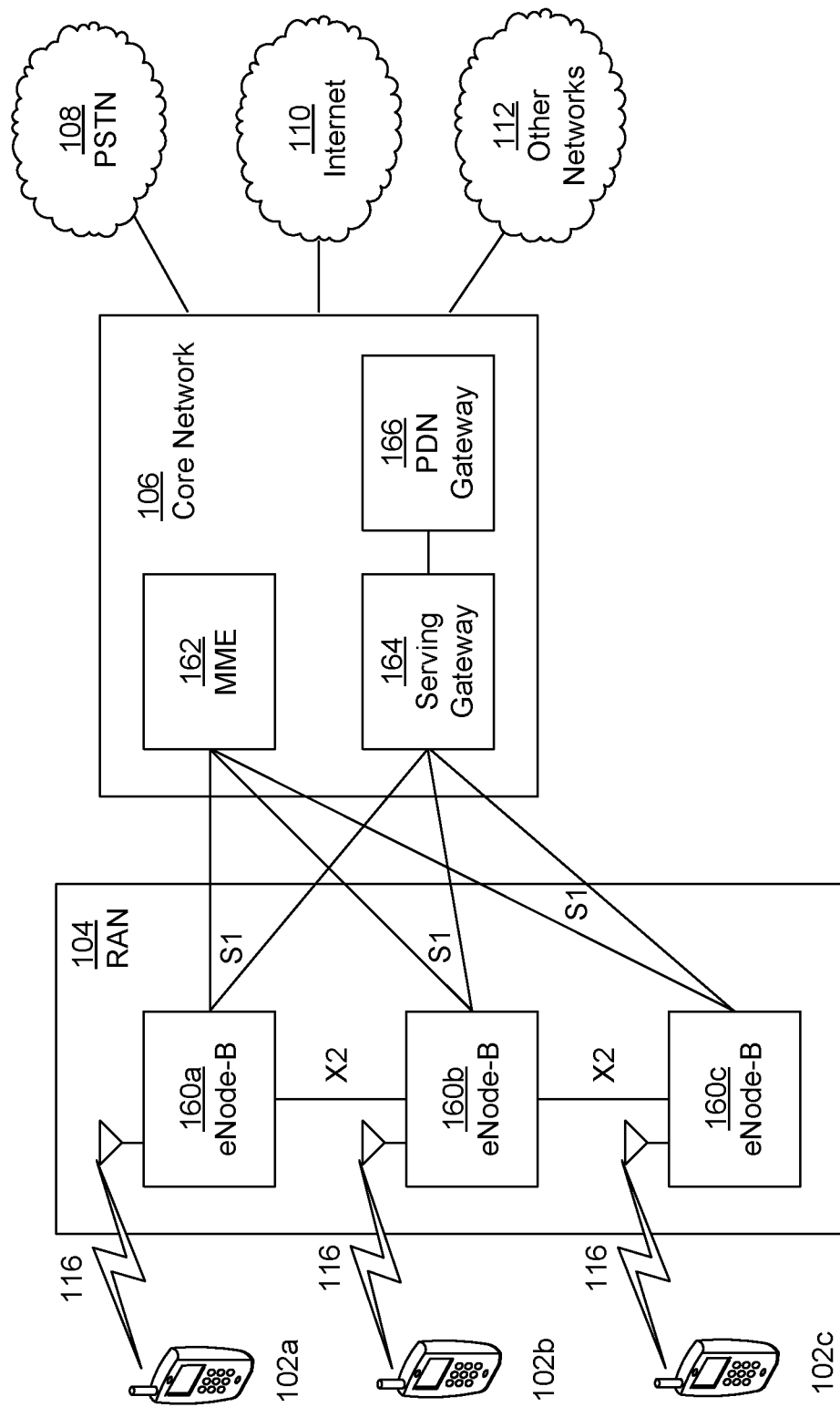
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done, for example, on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
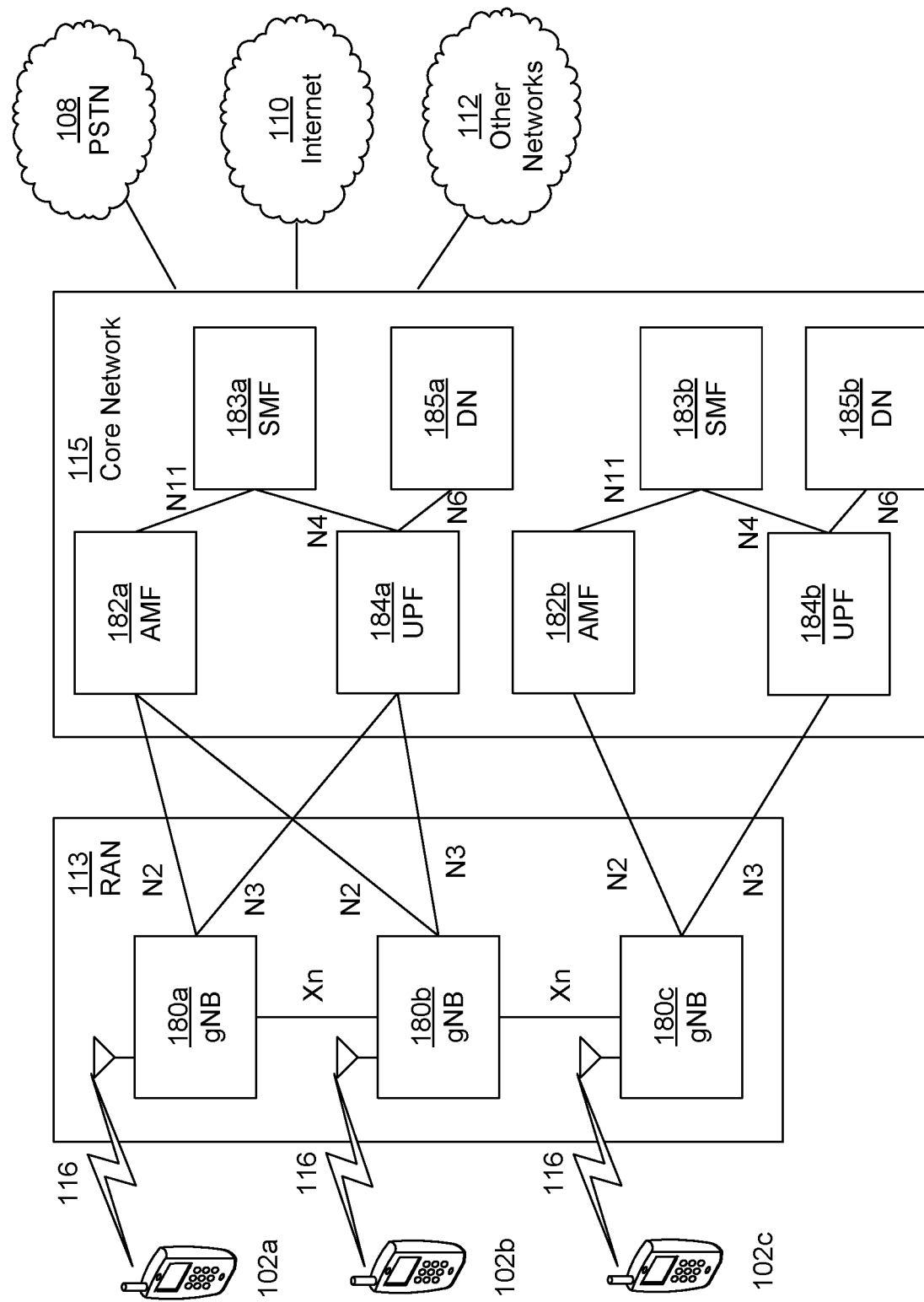
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
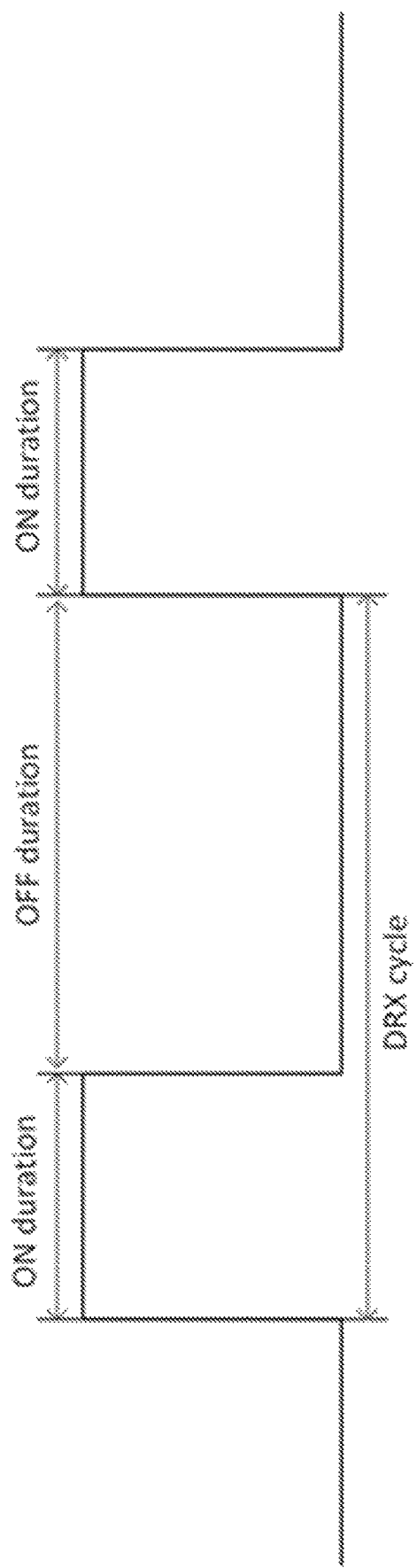
FIG. 2 illustrates an example of discontinuous reception (DRX).

Discontinuous reception (DRX) may be used to reduce or conserve energy use (e.g., for battery savings). A WTRU may use DRX to stop monitoring a DL control channel (e.g., a physical downlink control channel (PDCCH)) during certain sleep periods. A WTRU (e.g., in radio resource control (RRC) connected mode) may use connected mode DRX (C-DRX). FIG. 2 illustrates an example of discontinuous reception (DRX). FIG. 2 illustrates an ON duration and an OFF duration within a DRX cycle. A WTRU may monitor a configured PDCCH during an ON-duration period. The WTRU may sleep (e.g., not monitor the PDCCH) during an OFF duration. PDCCH may be used herein as a non-limiting example of a DL control channel.

A WTRU, during an OFF duration of a DRX cycle, may not measure or report channel state information (CSI) in a time unit (e.g., a subframe) configured to measure and/or report a periodic CSI reporting. A WTRU may monitor PDCCH and/or PDCCH occasions during an active time of a DRX cycle. Active time may occur during an ON duration. Active time may occur during an OFF duration. Active time may begin during an ON duration and/or continue during an OFF duration and/or vice versa.

Active Time may include the time while at least one of the following is true: a DRX timer is running (e.g., including one or more of an ON-duration timer, an inactivity timer, a retransmission timer in the DL and/or the UL, a random access contention resolution timer, and/or the like; a scheduling request may be sent and/or pending; a PDCCH indicating a different transmission addressed to the cell radio network temporary identifier (C-RNTI) of a MAC entity of the WTRU has not been received after successful reception of a random access response to the random access preamble that is not selected by the MAC entity among the contention-based random access preamble.

A type of signal (a wake-up signal (WUS) and/or a go-to-sleep signal (GOS) (WUS/GOS)) may be used, for example, with a DRX operation. A WUS/GOS may be associated with one or more DRX cycles. A WUS/GOS may be transmitted and/or received (transmitted/received), for example, prior to an associated time. A WUS/GOS may be transmitted and/or received (transmitted/received), for example, prior to a part of an associated DRX cycle.

A WTRU (e.g., having received a WUS) may monitor PDCCH, for example, in ON durations for one or more DRX cycles. A WTRU (e.g., having received a GOS) may skip monitoring PDCCH, for example, in ON durations for one or more DRX cycles and/or may stay in sleep mode. In examples, a sleep mode may include deep sleep.

A system or network (e.g., new radio (NR) for 5G wireless systems) may use WUS and/or GOS. A signal/channel may be used to transmit a wake-up or a go-to-sleep indication. For example, a bit field in a signal (e.g., a PDCCH-based signal) may indicate whether a WTRU should perform wake-up or go-to-sleep. A signal (e.g., indicating wake-up or go-to-sleep) may include or may be referred to as a power saving signal. A power saving signal may be transmitted, for example, before the ON duration of a DRX cycle starts. A time interval between the power saving signal and the start of the ON duration may include or may be referred to as an offset (e.g., a WUS-offset). An offset may be measured in one or more units of ms, slots, OFDM symbols, and/or the like. An offset may be measured from the beginning or from the end of a power saving signal.

A PDCCH and/or search space may be used (e.g., in NR for 5G systems) to provide a WTRU with opportunities to receive downlink control information (DCI). Different structures may be used for a PDCCH and/or a physical downlink shared channel (PDSCH) in different systems (e.g., 4G and 5G systems). Slot-based transmissions, non-slot-based transmissions, and/or different rates of monitoring may be used for PDCCH.

In examples, a Resource Element Group (REG) may be the smallest building block for PDCCH. A (e.g., each) REG may include multiple (e.g., 12) resource elements (REs) on a (e.g., one) OFDM symbol in time and a (e.g., one) resource block (RB) in frequency. In examples, a (e.g., each) REG may include nine (9) REs for control information and three (3) REs for a demodulation reference signal (DM-RS). Multiple REGs (e.g., 2, 3, or 6), which may be adjacent in time or frequency, may form a REG bundle, which may be used with the same precoder. DM-RSs for multiple REGs may be used together for channel estimation. Multiple (e.g., six (6)) REGs (e.g., in the format of 1, 2, or 3 REG bundles) may form a (e.g., one) Control Channel Element (CCE), which may be the smallest possible PDCCH. A (e.g., each) PDCCH may include one or more (e.g., multiple) CCEs (e.g., 1, 2, 4, 8, or 16 CCEs). The number of CCEs for a PDCCH may be called the PDCCH's aggregation level (AL).

Mapping of REG bundles may use interleaving or non-interleaving. Non-interleaving mapping may form a CCE from consecutive REG bundles (e.g., adjacent in frequency). CCEs adjacent in frequency may form a PDCCH. REGs (e.g., in interleaving mapping) may be are interleaved (or permuted) before being mapped to CCEs, which may result in (e.g., generally) non-adjacent REG bundles in a (e.g., one) CCE and non-adjacent CCEs in a (e.g., one) PDCCH.

A control resource set (CORESET) may be configured by and/or may comprise at least one of: a frequency assignment (e.g., as chunks of six (6) RBs), a length in time (e.g., one to three (1-3) OFDM symbols), a type of REG bundle, a type of mapping from REG bundles to CCEs (e.g., whether interleaving or non-interleaving), and/or the like. In a (e.g., each) bandwidth part (BWP), there may be, for example, up to N (e.g., 3) CORESETs. In an example, there may be 12 CORESETs in four (4) possible bandwidth parts.

A WTRU may monitor or may be assigned with a set of PDCCH candidates (e.g., to monitor). A set of PDCCH candidates may be monitored during the blind detection of a PDCCH. A search space or a set of search spaces (e.g., for multiple aggregation levels) may be or may include a set of PDCCH candidates (e.g., to monitor, such as with blind detection). A (e.g., each) search space or set of search spaces may be configured by at least one of: an associated CORESET, a number of candidates for or within an (e.g., each) aggregation level, a set of monitoring occasions, and/or the like. Monitoring occasions may be determined, for example, by one or more of a monitoring periodicity (e.g., in terms of slots), a monitoring offset, a monitoring pattern (e.g., with 14 bits corresponding to the possible patterns of symbols inside a slot), and/or the like.

A WTRU may (e.g., in NR) use a PDSCH slot offset, for example, to determine a timing relationship between a PDCCH transmission and PDSCH transmission. A WTRU may (e.g., in NR) be configured with a set of slot offsets for PDSCH scheduling from the slot where the WTRU received scheduling DCI. A WTRU may be configured with a PDSCH-TimeDomainResourceAllocationList (PDSCH-TDRA list), which may include, for example, up to 16 PDSCH-TimeDomainResourceAllocation (PDSCH-TDRA) configurations. A (e.g., each) PDSCH-TDRA configuration may include, for example, one or more of the following: a k0 value, which may be one of {0, 1, . . . , 32}; a mapping type, which may be one of {typeA, typeB}; a starting symbol and length (SLIV), which may be one of {0, 1, . . . , 127}; and/or the like. A k0 value may determine a slot offset for a PDSCH reception from the slot where a scheduling DCI is received. For example, a WTRU may receive a DCI for a PDSCH in a slot #n. The WTRU may receive the PDSCH in a slot #n+k0. A mapping type may determine slot length, where type A may be used for a normal slot length and type B may be used for a sub-slot length. An SLIV may determine a starting symbol and/or the length of a PDSCH within a slot.

A WTRU may not wake up when it is supposed to for a DRX ON-duration. Misdetection of a wake-up signal (e.g., a power saving signal) may occur. Inaccurate beam pairing between the transmitter and receiver may increase misdetection probability, for example in higher frequencies.

A WUS may carry additional information, including an indication of switching between a cross-slot and/or regular scheduling. In an example, a conflict may occur between the information in a wake-up signal (e.g., if the wake-up signal carries additional information) and a scheduling DCI.

A power saving signal (PSS) (e.g., a WUS) may be associated with an interval of time. The terms PSS and WUS may be used interchangeably herein. A WTRU may be configured to perform one or more (e.g., certain) tasks during the interval of time. A WTRU may be configured to perform certain tasks during the interval of time based on, for example, the presence of the power saving signal and/or contents of the PSS. A PSS may be defined for an interval of time, for example, so that a WTRU may (e.g., be expected to) perform certain tasks during the interval of time, e.g., depending on the existence and/or contents of the PSS.

Figure 6:
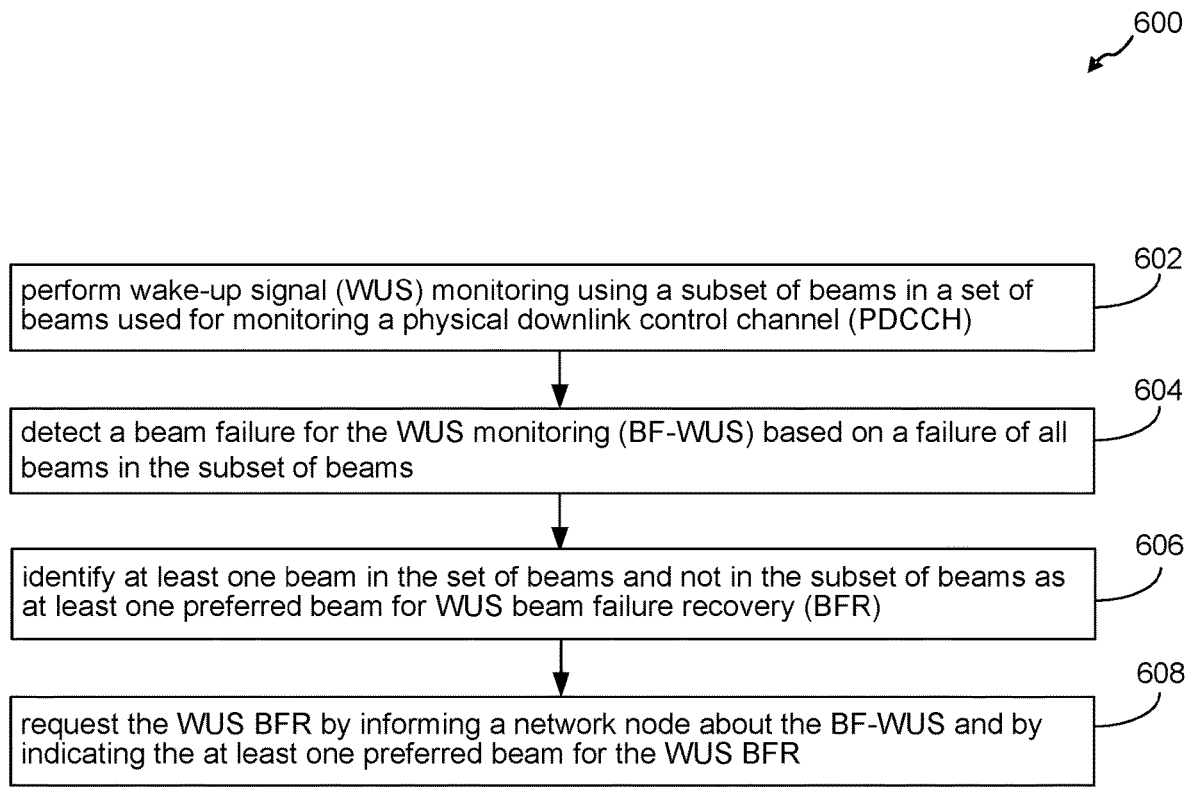
FIG. 6 illustrates an example of a method for beam failure detection and recovery for WUS monitoring.

In an example, a WTRU may (e.g., be expected to) monitor PDCCH, for example, during the ON duration of a DRX cycle (e.g., as shown in 602 of FIG. 6, the WTRU may monitor a set of beams for PDCCH during the ON duration of a DRX cycle and perform WUS monitoring using a subset of beams, for example, before the ON duration of the DRX cycle). A WTRU may perform a specified behavior during the ON duration. For example, a WTRU may start a relevant timer(s), e.g., as specified by the MAC layer. A WTRU may skip a DRX ON duration. A WTRU may not monitor PDCCH in the skipped ON-duration. In an example, a WTRU may skip the DRX ON duration and not monitor PDCCH in the skipped ON-duration, for example, if a wake-up signal is not detected or if a wake-up signal is detected but the contents of the wake-up signal indicate skipping the DRX ON duration. A PSS may be associated with a DRX ON duration. In an example, a PSS may be associated to a specific DRX ON duration.

A PSS may be associated with discontinuous time intervals (e.g., multiple DRX ON durations). In one or more examples, it may be assumed that a PSS is associated with a time interval (e.g., one-to-one mapping with a PSS and a DRX ON duration). The duration of active time may be longer than the ON duration, for example, due to activity of the WTRU exceeding the ON duration. An (e.g., each) active time may include one or more slots.

Figure 3:
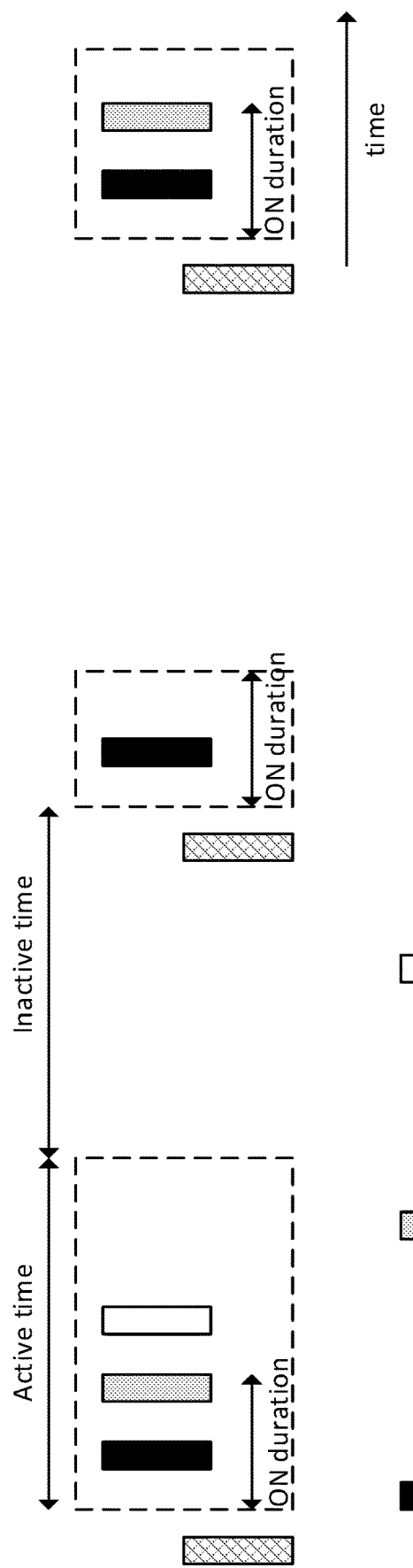
FIG. 3 illustrates an example of CORESETs used for physical downlink control channel (PDCCH) in active time and/or the WUS.

FIG. 3 illustrates an example of CORESETs used for PDCCH in active time and/or a WUS. The example shown in FIG. 3 may illustrate the CORESETS that a WTRU monitors in a (e.g., each) active time. A WTRU may monitor (e.g., and/or perform measurements of) CORESETs #1, #2, and #3 in the first active time (e.g., as shown by example in FIG. 3). The WTRU may monitor (e.g., and/or perform measurement of) CORESET #1 in the second active time. The active CORESETs in different active times may be different, for example, due to one or more of the following: an RRC configuration and/or reconfiguration, a periodicity and/or slot offset parameters of the search space associated with the CORESETs, and/or the like.

Figure 4:
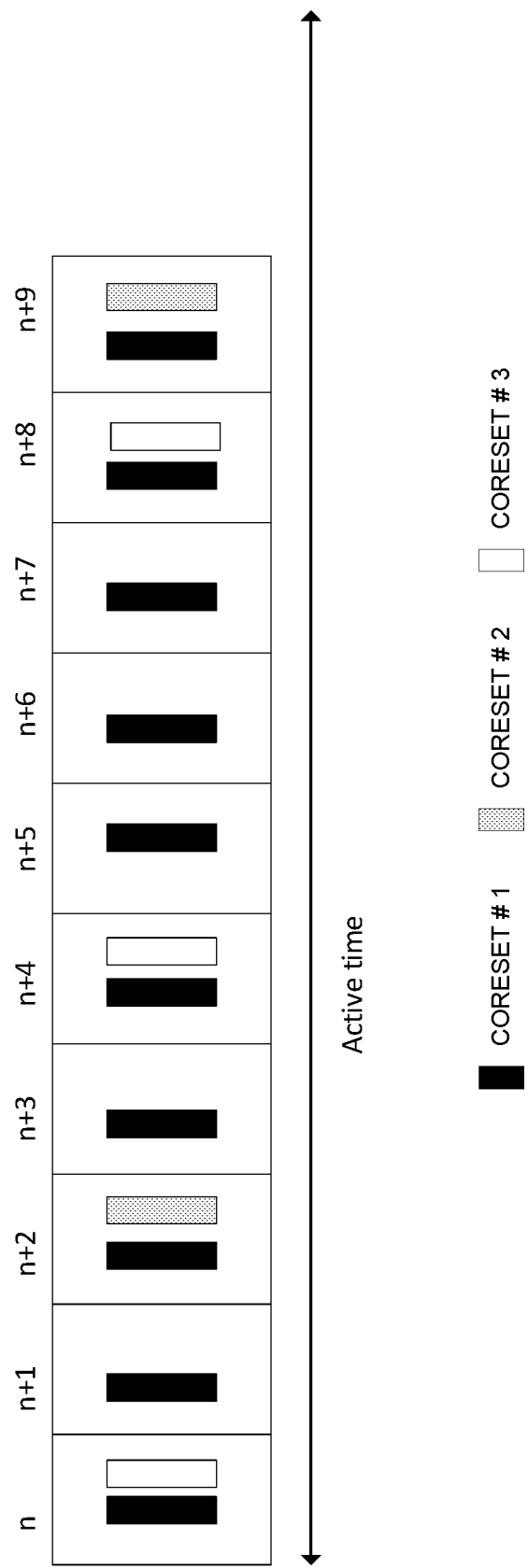
FIG. 4 illustrates an example of CORESETs monitored in a slot of an active time.

FIG. 4 illustrates an example of monitoring CORESETs in time slots of an active time interval. The example shown in FIG. 4 may illustrate the CORESETs that a WTRU may monitor within an (e.g., one) active time in a (e.g., each) slot. One or more (e.g., specific or selected) search spaces and/or associated CORESETs may be monitored within an active time interval, for example, depending on search space parameters. The periodicity of a (e.g., each) search space may be different. Active CORESETs may be different from one slot to another. In an example (e.g., as shown in FIG. 4), CORESET 1 may be monitored with a periodicity of 1 slot, CORESET 3 may be monitored with a periodicity of 4 slots, and CORESET 2 may be monitored with a periodicity of 7 slots.

A PSS may be a WUS and/or may be transmitted before the associated DRX ON duration(s). A CORESET in which a PSS is transmitted may be referred to as a CORESET_PSS. A CORESET configured for an ON-duration associated with a PSS may be referred to a CORESET_ON. PSS and WUS may be used interchangeably (e.g., and they may also be referred to as WUS PSS). For example, as shown in 602 of FIG. 6, the WTRU may monitor a set of beams for PDCCH for the ON-duration and perform WUS monitoring using a subset of beams, for example, before the ON duration of the DRX cycle.

A CORESET_PSS may be determined, for example, dynamically. In an example, a CORESET_PSS associated with an ON-duration may be a CORESET_ON in an associated ON-duration. A CORESET identity (CORESET-id) may be shared, determined, selected, and/or used by CORESET_PSS and CORESET_ON.

A search space for PSS monitoring may be associated with a (e.g., any) CORESET-id. CORESET identity, CORESET-id, CORESET_PSS identity, CORESET_ON identity, CORESET_PSS-id, and CORESET_ON-id may be used interchangeably in one or more examples. A determined CORESET_PSS may be used to monitor a search space for PSS for an associated ON-duration. A search space for PSS monitoring may be referred to as SS_PSS. A monitoring occasion of an SS_PSS may be determined based on, for example, one or more of following: N-slots earlier than the first PDCCH monitoring occasion of the associated ON-duration; N-slots earlier than the first slot of the associated ON-duration; N, which may be determined based on various parameters and/or factors; and/or the like.

A monitoring occasion of SS_PSS may be determined, for example, N-slots earlier than the first PDCCH monitoring occasion of the associated ON-duration. The first PDCCH monitoring occasion may start from the beginning (e.g., from the ON-duration) or may start K-slots later (e.g., after ON-duration start).

A monitoring occasion of SS_PSS may be determined, for example, N-slots earlier than the first slot of the associated ON-duration.

A monitoring occasion of SS_PSS may be determined, for example, based on N, which may be determined based on various parameters and/or factors. N may be determined based, for example, on one or more of following: the number of beams used, the number of CORESETs associated with an ON-duration, subcarrier spacing, cyclic prefix (CP) length, WTRU capability, a higher layer configuration (e.g., as a part of a PSS configuration), and/or the like.

For example, N may be determined based on the number of beams used. N may be determined, for example, based on the number of beams used for PDCCH monitoring. The number of beams used for PDCCH monitoring may be associated with a number of CORESETs. For example, the number of beams for PDCCH monitoring may be the number of CORESETs with different quasi co-location (QCL)-typeD associated with the search spaces within the associated ON-duration. QCL-typeD may indicate a beam reference signal that may have the same spatial-Rx characteristic. Beams with the same QCL-typeD parameter may be considered as the same beam. A QCL-typeD indication may be based on transmission configuration indicator (TCI) indication.

For example, N may be determined based on subcarrier spacing. For example, N may be larger if and/when the subcarrier spacing becomes wider.

Examples described herein may be applicable to multiple signal types or states. For example, although some examples may be described in terms of a beam, an Rx beam, a Tx beam, a Tx-Rx beam pair, a QCL-typeD, an associated beam reference signal, a TCI state, an associated Rx beam reference signal, an associated synchronization signal block (SSB), a spatial Rx characteristic, and/or a QCL, the examples may be (e.g., equally) applicable to other signals or parameters (e.g., as described herein). Thus, in terms of applicability of examples and other description herein, terms in examples may be used interchangeably. Examples described in terms of a transmission configuration (e.g., a beam) may be (e.g., equally) applicable to other transmission configurations (e.g., a TCI state). Techniques described herein may be applicable to any of a beam, a Tx beam, a Tx-Rx beam pair, a QCL-typeD, an associated beam reference signal, a TCI state, an associated Rx beam reference signal, an associated SSB, a spatial Rx characteristic, and/or a QCL, for example, even though the example is described with respect to other terms.

A WTRU may be configured to have and/or use beam information to monitor a PSS signal. A WTRU may determine a CORESET_PSS for an associated ON-duration. A WTRU may determine a CORESET_PSS for an associated ON-duration, for example, based on the CORESET_ON(s) and/or the search spaces configured for the associated ON-duration. One or more (e.g., a combination) of the following techniques may be used to determine a CORESET_PSS: one or more configured parameter(s) of a CORESET_ONs and/ or search spaces configured in an associated ON-duration; at least one measurement of an attribute of a CORESET_ON; the TCI states of a CORESET_ON(s); and/or the like.

A CORESET_PSS may be determined, for example, based on one or more configured parameter(s) of the CORESET_ONs and/or search spaces, which may be configured in the associated ON-duration.

The one or more configured parameter(s) of the CORESET_ONs and/or search spaces configured in the associated ON-duration used to determine the CORESET_PSS may include the resource element group (REG) mapping type and/or the frequency resources. In an example, the CORESET_ON parameter that may be used to determine CORESET_PSS may be the REG mapping type and/or the frequency resources. CORESET_PSS may be determined, for example, based on the CORESET_ONs with non-interleaved REG mapping. CORESET_PSS may be determined, for example, based on the CORESET_ONs with a frequency allocation bandwidth below a threshold. For example, a CORESET_PSS may be the same as a CORESET_ON with the smallest bandwidth.

The one or more configured parameter(s) of the CORESET_ONs and/or search spaces used to determine the CORESET_PSS may include the CORESET_ON ID(s). In an example, a CORESET_PSS may be determined based on the CORESET_ON ID(s). For example, the CORESET_PSS may be the same CORESET as the CORESET_ON with a certain (e.g., the smallest) ID.

The one or more configured parameter(s) of the CORESET_ONs and/or search spaces used to determine the CORESET_PSS may include the ID(s) of the search spaces configured in the associated ON-duration. In an example, a CORESET_PSS may be determined based on the ID(s) of the search spaces configured in the associated ON-duration. For example, the CORESET_PSS may be the same CORESET as the CORESET_ON that may be configured as part of the search space with the smallest ID. The CORESET_PSS may be the same CORESET as the CORESET_ON that may be configured as part of a WTRU-specific search space with the smallest ID or may be the same CORESET as the CORESET_ON that may be configured as part of the group common search space with the smallest ID.

The one or more configured parameter(s) of the CORESET_ONs and/or search spaces used to determine the CORESET_PSS may include the aggregation level of the search spaces configured in the associated ON-duration. In an example, a CORESET_PSS may be determined based on the aggregation level of the search spaces configured in the associated ON-duration. For example, the CORESET_PSS may be the same CORESET as the CORESET_ON that may be configured as part of a search space with a certain (e.g., the largest) aggregation level.

The one or more configured parameter(s) of the CORESET_ONs and/or search spaces used to determine the CORESET_PSS may include the DCI format of the search spaces configured in the associated ON-duration. In an example, a CORESET_PSS may be determined based on the DCI format of the search spaces configured in the associated ON-duration. For example, the CORESET_PSS may be the same CORESET as the CORESET_ON that may be configured as part of a search space with a specific (e.g., selected) DCI format and/or the DCI format having a certain (e..g., the smallest) size among the configured DCI formats.

The one or more configured parameter(s) of the CORESET_ONs and/or search spaces used to determine the CORESET_PSS may include the search space type of the search spaces configured in the associated ON-duration. In an example, a CORESET_PSS may be determined based on the search space type of the search spaces configured in the associated ON-duration. For example, the CORESET_PSS may be the same CORESET as the CORESET_ON that may be configured as part of a WTRU specific search space, for example, if the PSS is WTRU specific. The CORESET_PSS may be the same CORESET as the CORESET_ON that may be configured as part of a group common search space, for example, if the PSS is group-common.

The one or more configured parameter(s) of the CORESET_ONs and/or search spaces used to determine the CORESET_PSS may include the periodicity of the search spaces configured in the associated ON-duration. In an example, a CORESET_PSS may be determined based on the periodicity of the search spaces configured in the associated ON-duration. For example, the CORESET_PSS may be the same CORESET as the CORESET_ON that may be configured as part of the search space with the smallest periodicity.

The one or more configured parameter(s) of the CORESET_ONs and/or search spaces used to determine the CORESET_PSS may include a CORESET-id of the CORESET_ONs. In an example, a CORESET_PSS may be determined based on a certain (e.g., the lowest) CORESET-id of the CORESET_ONs. For example, one or more search spaces may be located or monitored in ON-duration. A (e.g., each) search space may be associated with a CORESET. The CORESET with an associated search space in the ON-duration may be the CORESET_ON. The CORESET_PSS may be the CORESET_ON with a certain (e.g., the lowest) CORESET-id within the CORESET_ONs. The CORESET_PSS may be changed at different ON-durations. For example, the CORESET_PSS may be changed in some (e.g., every) ON-duration(s), for example, based on the set of search spaces that may be monitored during the associated ON-duration.

The one or more configured parameter(s) of the CORESET_ONs and/or search spaces used to determine the CORESET_PSS may include a default CORESET (or initial CORESET) in which a broadcasting channel may be received. In an example, a CORESET_PSS may be predetermined as default CORESET (e.g., or initial CORESET) in which a broadcasting channel may be received.

A CORESET_PSS may be determined, for example, based on at least one measurement of an attribute of the CORESET_ON. The CORESET_PSS may be the same CORESET as the CORESET_ON associated with a certain reference signal received power (RSRP). For example, a CORESET_PSS may be the same CORESET as the CORESET_ON with the largest RSRP. The RSRP may be measured using at least one RS indicated in the TCI state of the CORESET_ON. The RS may be a specific QCL type (e.g., QCL_D). In an example, a CORESET_PSS may be the same CORESET as the CORESET_ON with the largest RSRP. The RSRP may be measured using at least one RS indicated in the TCI state of the CORESET_ON. For example, the measurement of one or more beams configured for monitoring a PSS may be performed at a certain time (e.g., before DRX-ON and/or during DRX-ON). The measurement may be performed in a specific time interval (e.g., within N slots before the PSS slot).

A CORESET_PSS may be determined, for example, based on the TCI states of the CORESET_ON(s). The CORESET_PSS may be the same CORESET as the CORESET_ON with an activated TCI state. For example, the CORESET_PSS may be the same CORESET as the CORESET_ON with the most recently activated TCI state.

A WTRU may determine a CORESET_PSS, for example, using one or more criteria (e.g., a combination of at least two criteria), e.g., as described herein. For example, a CORESET_PSS may be the same CORESET as the CORESET_ON that may be configured as part of a WTRU specific search space with a certain (e.g., the smallest) periodicity. For example, a CORESET_PSS may be the same CORESET as the CORESET_ON with a certain (e.g., the most recently activated) TCI state among CORESETs configured as part of a WTRU specific search space. One or more configured parameter(s) of the CORESET_ONs and/or search spaces that may be used to determine the CORESET_PSS may correspond to a plurality of the parameters of the CORESET_ONs and/or search spaces in various combinations.

In examples (e.g., as described herein), a CORESET_PSS and a CORESET_ON may use at least one common configuration parameter (e.g., TCI state, bandwidth, and/or the like), for example, after being determined based on at least one of the CORESET_ONs.

In an example, the search space for a PSS may be configured without a CORESET_PSS, and/or the CORESET_PSS (e.g., for every associated ON-duration) may be determined by the WTRU dynamically (e.g., by using one or more approaches and/or techniques described herein). In an example, a search space for a PSS may be configured with an initial CORESET_PSS, and/or the CORESET_PSS (e.g., for every associated ON-duration) may be determined dynamically (e.g., by using one or more of the approaches and/or techniques described herein).

In some examples, a certain CORESET_ON (e.g., a beam recovery CORESET) may be excluded and/or not used.

A TCI state of a CORESET_PSS may be determined, for example, dynamically. A TCI state of a CORESET_PSS may be associated with a beam used to receive a PSS. For example, a TCI state of a CORESET_PSS may determine the beam used to receive a PSS. The active TCI state for a CORESET_PSS may include a reference signal (RS). In an example, an active TCI state for a CORESET_PSS may include at least one RS with a QCL_typeD. A WTRU may use the same receive beam for the RS and the CORESET_PSS.

A receive beam for a PSS (e.g., WUS) may be determined, for example, based on active-time receive beams. In an example, a receive beam for the PSS may be determined based on the active-time receive beams that may be configured to be used to receive the CORESETs in the associated active-time. In a similar or equivalent implementation, a TCI state for a CORESET_PSS may be determined, for example, based on the active-time TCI state(s) of the CORESETs in the associated active time.

In an example, a TCI state of a CORESET_PSS may be the same as a TCI state of a CORESET_ON of an associated ON-duration.

A WTRU may determine a TCI state of a CORESET_PSS, for example, based on the CORESET_ON(s) and/or the search spaces configured for the associated ON-duration. A WTRU may determine a TCI state of a CORESET_PSS, for example, based on or more (e.g., a combination of) the following: one or more configured parameter(s) of the CORESET_ONs and/or search spaces configured in the associated ON-duration; at least one measurement of an attribute of the CORESET_ON; TCI states of the CORESET_ON(s); and/or the like.

A CORESET_PSS TCI state may be determined based on one or more configured parameters of the CORESET_ONs and/or search spaces configured in the associated ON-duration.

The one or more configured parameter(s) of the CORESET_ONs and/or search spaces configured in the associated ON-duration may include the CORESET_ON ID(s). In an example, a CORESET_PSS TCI state may be determined based on the CORESET_ON ID(s). For example, a CORESET_PSS may have the same TCI state as the CORESET_ON associated with a certain (e.g., the smallest) ID.

The one or more configured parameter(s) of the CORESET_ONs and/or search spaces configured in the associated ON-duration may include the ID(s) of the search spaces. In an example, a CORESET_PSS TCI state may be determined based on the ID(s) of search spaces in an associated ON-duration. For example, a CORESET_PSS may have the same TCI state as the CORESET_ON that is linked to a search space associated with a certain (e.g., the smallest) ID. For example, a CORESET_PSS may have the same TCI state as the CORESET_ON that is configured as part of the WTRU specific search space with a certain (e.g., the smallest) ID or configured as part of the group common search space with a certain (e.g., the smallest) ID.

The one or more configured parameter(s) of the CORESET_ONs and/or search spaces configured in the associated ON-duration may include the REG mapping type and/or the frequency resources. In an example, a CORESET_ON parameter may be the REG mapping type and/or the frequency resources. For example, a CORESET_PSS may have the same TCI state as the CORESET_ON with a certain (e.g., non-interleaved) REG mapping. For example, a CORESET_PSS may have the same TCI state as the CORESET_ON with a certain frequency allocation bandwidth (e.g., below a threshold), for example, the smallest bandwidth.

The one or more configured parameter(s) of the CORESET_ONs and/or search spaces configured in the associated ON-duration may include the aggregation level of the search spaces configured in the associated ON-duration. In an example, a CORESET_ON parameter may be the aggregation level of the search spaces configured in the associated ON-duration. For example, a CORESET_PSS may have the same TCI state as the CORESET_ON that may be configured as part of the search space with a certain (e.g., the largest) aggregation level.

The one or more configured parameter(s) of the CORESET_ONs and/or search spaces configured in the associated ON-duration may include the DCI format of the search spaces configured in the associated ON-duration. In an example, a CORESET_PSS TCI state may be determined based on the DCI format of the search spaces configured in the associated ON-duration. For example, a CORESET_PSS may have the same TCI state as the CORESET_ON that may be configured as part of the search space with a specific DCI format and/or the DCI format associated with a certain (e.g., the smallest) size among the configured DCI formats.

The one or more configured parameter(s) of the CORESET_ONs and/or search spaces configured in the associated ON-duration may include the search space type of the search spaces configured in the associated ON-duration. In an example, a CORESET_PSS TCI state may be determined based on the search space type of the search spaces configured in the associated ON-duration. For example, a CORESET_PSS may have the same TCI state as the CORESET_ON that may be configured as part of a WTRU specific search space, for example, if the PSS is WTRU specific. A CORESET_PSS may have the same TCI state as the CORESET_ON that may be configured as part of a group common search space, for example, if the PSS is group-common.

The one or more configured parameter(s) of the CORESET_ONs and/or search spaces configured in the associated ON-duration may include the periodicity of the search spaces configured in the associated ON-duration. In an example, a CORESET_PSS TCI state may be determined based on the periodicity of the search spaces configured in the associated ON-duration. For example, a CORESET_PSS may have the same TCI state as the CORESET_ON that may be configured as part of a search space with a certain periodicity (e.g., corresponding to the DRX cycle). For example, a CORESET_PSS may have the same TCI state as the CORESET_ON that may be configured as part of the search space associated with a certain (e.g., the smallest) periodicity. In an example, multiple search spaces may be configured with a certain (e.g., the smallest) periodicity. The search space with a certain (e.g., the smallest) ID among the multiple search spaces may be selected.

A CORESET_PSS TCI state may be determined, for example, based on at least one measurement of an attribute of the CORESET_ON. An attribute of the CORESET_ON may include, for example, RSRP. A CORESET_PSS TCI state may be determined, for example, based on the TCI state of the CORESET_ON with an (e.g., a certain) RSRP. For example, a CORESET_PSS TCI state may be the same TCI state as the CORESET_ON with the largest RSRP. An RSRP may be measured, for example, using at least one RS indicated in the TCI state of the CORESET_ON. An RS may be a (e.g., specific) QCL type (e.g., QCL_D). In an example, a CORESET_PSS TCI state may be the same TCI state as the CORESET_ON associated with a certain (e.g., the largest) RSRP. An RSRP may be measured, for example, using at least one RS indicated in the TCI state of the CORESET_ON. The measurement may be performed in a (e.g., specific) time interval (e.g., within N slots of the PSS).

A CORESET_PSS TCI state may be determined, for example, based on the TCI states of the CORESET_ON(s). A CORESET_PSS may have the same TCI state as the CORESET_ON with an activated TCI state. For example, a CORESET_PSS may have the same TCI state as the CORESET_ON with a certain (e.g., the most recently activated) TCI state. A WTRU may use a default TCI state for a CORESET_PSS, for example, if the time gap between the most recent activation of the CORESET_ON TCI state and the PSS reception is above a threshold.

A WTRU may use one or more (e.g., a combination of at least two) criteria (e.g., as described herein), for example, to determine a CORESET_PSS TCI state. For example, a CORESET_PSS may have the same TCI state as the CORESET_ON that may be configured as part of a WTRU specific search space associated with a certain (e.g., the smallest) periodicity.

In examples, a CORESET_PSS may be configured without a TCI state. A WTRU may be configured to determine a TCI state (e.g., dynamically) for a (e.g., each) associated ON-duration. A WTRU may (e.g., dynamically) determine a TCI state, for example, using one or more (e.g., a combination of) approaches or techniques described herein. In examples, a TCI state of a CORESET_PSS may be configured with an initial TCI state. A WTRU may determine a TCI state (e.g., dynamically) for a (e.g., each) associated ON-duration, for example, using one or more approaches or techniques described herein.

A power saving signal may be transmitted from a network node to a WTRU. A power saving signal may be transmitted before the start of the ON duration. In an example, a power saving signal may be transmitted in the inactive time. A power saving signal may be transmitted in a predefined or configured time interval, for example, before the start of the ON duration. A power saving signal may be transmitted in a PDCCH. A power saving signal may be subject to beamforming and/or precoding.

A WTRU may determine at least one attribute of a procedure used to receive a PDCCH and/or a PDSCH, for example, based on at least one attribute of a wake-up signal. In an example, a WTRU may use at least one attribute of a wake-up signal to (e.g., implicitly) determine at least one attribute of a procedure that may be used to receive a PDCCH and/or a PDSCH in the ON duration associated with the wake-up signal. An ON duration associated with a wake-up signal may include, for example, an ON duration indicated by a power saving signal when the WTRU is configured to monitor or monitoring the PDCCH.

The attributes of a power saving signal may include, for example, one or more of the following: a DM-RS (e.g., including the reference signal sequence and/or the scrambling ID(s)); an ID of a transmit beam and/or a precoding vector applied to a power saving signal; an ID of CORESET(s) over which the power saving signal is transmitted; an aggregation level of a power saving signal; and/or the like.

Attributes of an ON duration may be determined (e.g., implicitly) by a power saving signal. Attributes of an ON duration may include, for example, one or more of the following: a set of monitored search spaces (e.g., selected from a set of configured search spaces); a set of monitored CORESETs (e.g., selected from a set of configured CORESETs); a power saving state; and/or the like. In examples, a WTRU may or may not implement a power saving scheme, which may be indicated in the attributes of an ON duration (e.g., in the power saving state).

A WTRU may determine a receive beam that may be applied to OFDM symbol(s), for example, based on a TCI state associated with the OFDM symbol(s). A search space may include (e.g., as a set of parameters), for example, a set of periodic slots and OFDM symbols within the slots to monitor the PDCCH, and/or the like. In an example, an OFDM symbol or a group of OFDM symbols in a slot associated with a search space may be associated with a corresponding TCI state. A WTRU may apply a receive beam to OFDM symbol(s) in a slot, for example, when the WTRU is monitoring PDCCH in accordance with a search space configuration. A beam may be determined, for example, using a TCI state associated with OFDM symbol(s). A TCI state may include (e.g., as a set of parameters), for example, a CSI-Reference Signal (CSI-RS) index and/or an SSB index with QCL type information. In an example, a WTRU may apply a receive beam to the OFDM symbol(s). The receive beam may be determined, for example, from the CSI-RS or the SSB with QCL Type D.

A receive beam may be determined, for example, based on a TCI state associated with a time interval. In an example, a WTRU may apply multiple receive beams to an incoming signal over multiple time intervals. A receive beam may be determined from a TCI state associated with a time interval (e.g., among the multiple time intervals). A beam that results in a successful decoding of a channel may be used to determine an attribute of procedures used in the ON duration, e.g., implicitly. A TCI state that results in a successful decoding of a channel may be used to determine an attribute of one or more procedures that may be used in the ON duration, e.g., implicitly. A time interval may be one or more OFDM symbols and/or one or more slots. In an example, a power saving signal may be transmitted over multiple time instances, for example, using the same CORESET. A time instance may be associated with a TCI state (e.g., a corresponding TCI state). A TCI state that results in successful decoding of a PDCCH may be used to indicate an attribute of a procedure used in receiving a PDCCH and/or a PDSCH, for example, in the ON duration associated with a wake-up signal.

A receive beam may be determined from a TCI state of a different CORESET. In an example, a power saving signal may be transmitted over multiple time instances and/or a different CORESET may be used on some (e.g., each) time instance(s). A WTRU may apply a receive beam to a CORESET. A receive beam may be determined from the TCI state of a CORESET. A receive beam and/or a TCI state that results in a successful decoding of a PDCCH may be used, for example, to determine an attribute of the PDCCH and/or a PDSCH, for example, in the ON duration associated with the WUS.

Misdetection may be prevented. A WTRU may be configured to stay in a wake-up state, for example, regardless whether a WUS has been received. A WTRU may be configured to ignore WUSs. In an example, a WTRU may ignore a WUS, for example, by assuming that a PSS indication to wake-up has been received and wake up (e.g., start monitoring the PDCCH in the associated ON-duration) regardless whether a wake-up signal has actually been received, which may be referred to as ignoring the WUS. A WTRU may stay in a WUS-ignoring state for a period of time and then resume normal operation (e.g., wake-up when the WTRU receives a WUS). A WTRU may stay in a WUS-ignoring state for a period of time until (e.g., only until) the WTRU is indicated to resume normal operation, for example, when the WTRU receives a WUS.

A WTRU may ignore (e.g., skip decoding) a PSS/WUS under various conditions. A WTRU may be triggered to ignore a WUS, for example, based on one or more of the following conditions: whether a measure (e.g. RSRP) of the RSs indicated by the active TCI state of the CORESET_PSS may be below a threshold; the quality of the RSs indicated in the TCI state(s) of the CORESET_PSS (e.g., whether the quality is below a threshold a number of times); PDCCH link quality measurements (e.g., below a threshold a number of times); whether the time from the activation of the TCI state of a CORESET_PSS to the time the WTRU is configured to monitor the PSS may exceed a threshold; whether a WTRU speed may fall below a threshold; whether the active time extends and the time configured for the WTRU to monitor the WUS may be within the active time; whether a certain DRX timer may be running at the time configured for the WTRU to monitor the WUS; the type of the WUS; and/or the like. As described herein, the measurement of one or more beams configured for monitoring a PSS may be performed at a certain time (e.g., before DRX-ON and/or during DRX-ON).

A WTRU may be triggered to ignore a WUS, for example, if a measure (e.g. RSRP) of the RSs indicated by an active TCI state of a CORESET_PSS is below a threshold. In an example, an indicated RS may be an SSB and/or a CSI-RS. It may be assumed that at least one RS is indicated by a TCI state. A WTRU may ignore a PSS, for example, if a measure of at least one RS falls below a threshold. In an example, a WTRU may ignore a PSS if a measure of multiple (e.g., all) RSs falls below a threshold. In examples, different RSs may have different thresholds. A WTRU may ignore a PSS, for example, if a measure of the RS that is used to determine the receive beam falls below a threshold. For example, an RS used to determine a receive beam for a CORESET_PSS may be an RS with a QCL Type D. More than one CORESET may be used to transmit a WUS. A WTRU may ignore a WUS, for example, if the RS(s) indicated in the TCI state of at least one CORESET (e.g., of the more than one CORESET) satisfies a wake-up condition. A WTRU may ignore a WUS, for example, if the RS(s) indicated in the TCI states of some or all individual CORESETs satisfy the wake-up condition. In examples (e.g., in beam sweeping), individual CORESETs may be transmitted on different OFDM symbols within one slot and/or over different slots. A WTRU may ignore a WUS, for example, if the RS(s) indicated in the TCI state of at least one CORESET satisfies a wake-up condition (e.g., using criterion/criteria described herein). A WTRU may ignore a WUS, for example, if the RS(s) indicated in the TCI states of multiple (e.g., all) individual CORESETs satisfy a wake-up condition.

A WTRU may resume a regular operation, for example, if a measure exceeds a threshold and/or stays above a threshold for a specified period. In examples, a WTRU may start monitoring a WUS and wake-up (e.g., only) when indicated, for example, if the measure exceeds a threshold and/or stays above a threshold for a specified period. As described herein, the measurement of one or more beams configured for monitoring a WUS may be performed at a certain time (e.g., before DRX-ON). A different TCI state may be indicated for a CORESET_PSS, for example, explicitly or implicitly. A WTRU may send information to a base station to indicate a failure.

A WTRU may be triggered to ignore a WUS, for example, if a quality of the RSs indicated in the TCI state(s) of the CORESET_PSS falls below a threshold a (e.g., certain) number of times. A WTRU may monitor the quality of the RSs indicated in the TCI state(s) of the CORESET_PSS and may count the number of times the measure falls below a threshold. In an example, a counter may be incremented (e.g., by one (1)) if the measure of a (e.g., one) CORESET falls below a specified threshold. In an example, the WTRU may increment a counter (e.g., by 1) if the measure of multiple (e.g., all) CORESETs falls below a specified threshold. A WTRU may determine whether to ignore a PSS and/or reset a counter. A WTRU may (e.g., decide to) ignore a PSS and reset a counter, for example, if and/or when the counter hits a target number. A WTRU may send information to a base station, for example, to indicate a failure. A WTRU may resume regular operation, for example, if a different TCI state is activated for one or more (e.g., all) CORESET_PSS. A WTRU may start monitoring a WUS and wake-up (e.g., only) based on an indication, for example, if a different TCI state is activated for one or more (e.g., all) CORESET_PSS (e.g., explicitly or implicitly).

A WTRU may (e.g., in examples described herein and/or in other implementations) use a set of RSs other than those indicated (e.g., in examples described herein) in the TCI states or a set of RSs including those indicated in the TCI states.

A WTRU may use PDCCH link quality measurements to determine whether to ignore the PSS. A WTRU may monitor PDCCH link quality. A WTRU may start ignoring a PSS, for example, if the PDCCH link quality is relatively low (e.g., below a threshold measure). A WTRU may start ignoring the PSS, for example, if the counter for a beam failure instance indication hits (e.g., equals or exceeds) a specified target number. A counter may be increased (e.g., by one (1)), for example, if the RS indicated in a TCI state of the PDCCH CORESETs falls below a (e.g., specific) threshold. For example, the counter may be increased (e.g., by 1), for example, if an RS indicated in a (e.g., only one) TCI state of the PDCCH CORESETs falls below a (e.g., specific) threshold. A WTRU may send an indication to a base station and/or resume normal operation, for example, if a different TCI state is activated for one or more (e.g., all) PDCCH CORESETs. A WTRU may start ignoring a PSS, for example, if and/or when the PDCCH beam failure condition is met and/or until beam recovery is completed.

A WTRU may be triggered to ignore a WUS, for example, if a certain (e.g., selected, configured, fixed, and/or variable) time duration exceeds a threshold. A WTRU may start ignoring a PSS, for example, if a time (e.g., from the activation of a TCI state of a CORESET_PSS to the time the WTRU is configured to monitor the PSS) exceeds a threshold. The TCI state of a CORESET_PSS may be activated explicitly (e.g., by a MAC CE) or implicitly (e.g., as described herein).

A WTRU may be triggered to ignore a WUS, for example, if a WTRU speed changes. For example WTRU speed may exceed a threshold. The WTRU may ignore the WUS until the speed falls below a threshold. A WTRU may ignore a WUS, for example, if the WTRU is about to commence a handover or a procedure triggered by mobility.

A WTRU may be triggered to ignore a WUS, for example, if the active time extends. A WTRU may ignore a WUS and stay in a wake-up state (e.g., for the next ON duration), for example, if the active time extends and the time configured for the WTRU to monitor the WUS is within the active time.

A WTRU may be triggered to ignore a WUS, for example, if certain DRX timers are running. A WTRU may ignore a WUS and remain in a wake-up state (e.g., for the next ON duration), for example, if certain DRX timers are running at a time configured for the WTRU to monitor the WUS. The DRX timers may include, for example, one or more of drx-InactivityTimer, drx-RetransmissionTimerDL, drx-RetransmissionTimerUL, drx-HARQ-RTT-TimerDL, and/or drx-HARQ-RTT-TimerUL.

WTRU behavior may be determined by the type of WUS. A WTRU may behave differently, for example, depending on whether a WUS is WTRU specific or group common. A WTRU may wake-up if the WTRU detects a WUS and not wake-up if the WTRU does not detect the WUS, for example, if the WUS is WTRU specific (e.g., including information only for a single WTRU). A WTRU may wake-up if the WTRU detects a WUS and a codepoint within the WUS contents indicates to the WTRU to wake-up and the WTRU may not wake-up if the codepoint indicates to the WTRU not to wake-up, for example, if the WUS is group common (e.g., including information for a group of WTRU).

WUS may be associated with beam failure detection and/or recovery. One or more beams may be associated with a WUS, for example, for an operating frequency range. An example of an operating frequency range may be FR2. Beams may be mismatched between Tx and Rx. A WUS may be misdetected by a WTRU, for example, if a WUS is associated with one or more beams and the beams are mismatched between Tx and Rx.

Figure 5:
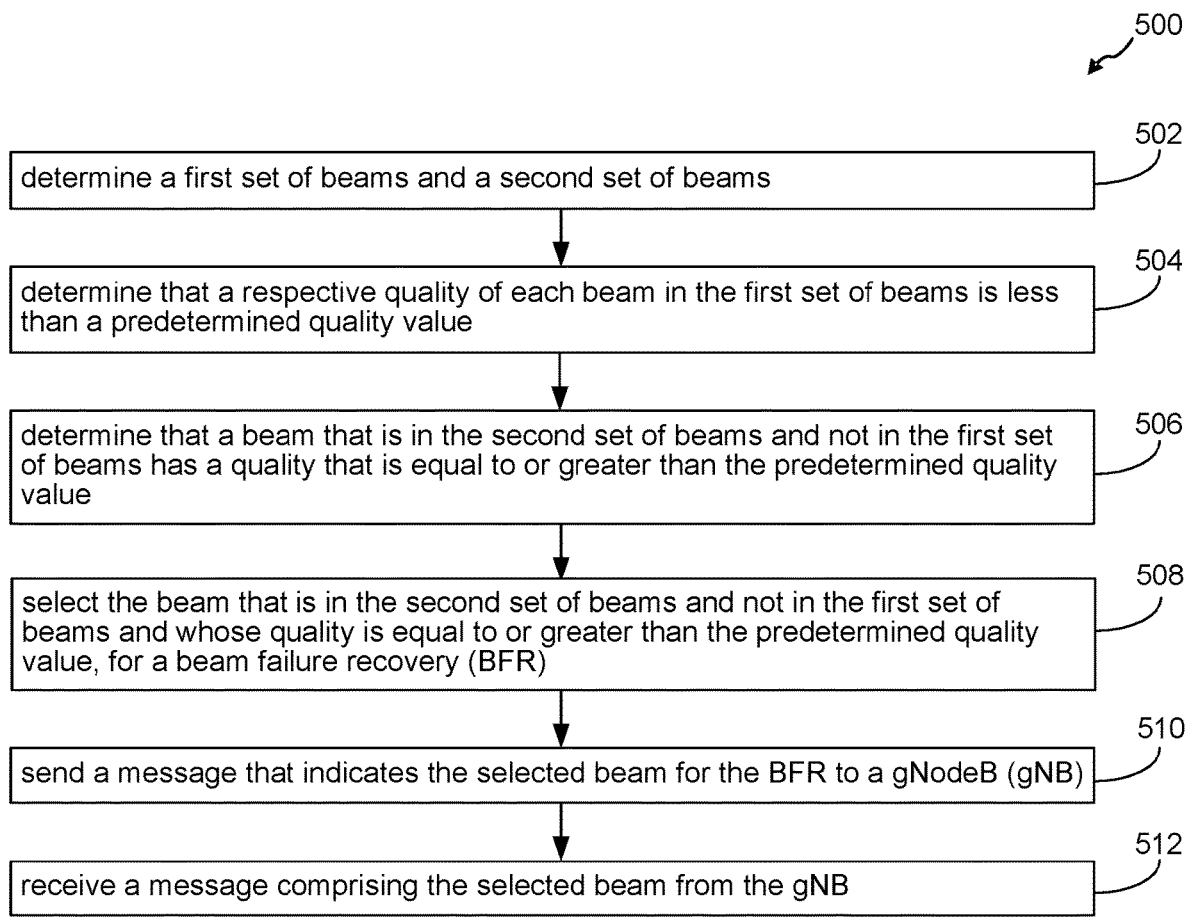
FIG. 5 illustrates an example of a method for beam failure detection and recovery.

A beam quality of a WUS may be measured by a WTRU, for example, if the WTRU is configured to monitor a WUS and one or more beams are associated with the WUS (e.g., as shown in 502 of the FIG. 5, the WTRU may be configured to monitor a first set of beams that is associated with the WUS). As described herein, the measurement of one or more beams configured for monitoring a PSS (e.g., CORSET_PSS) may be performed at a certain time (e.g., before DRX-ON). In examples, a WTRU may measure beam quality of one or more beam RSs associated with configured CORESETs (e.g., as shown in 502 of FIG. 5, the WTRU may determine a second set of beam that is associated with the configured CORESET); a WTRU may determine that a beam may have failed if the beam measurement quality is below a predetermined quality value such as a threshold (e.g., as shown in 504 of FIG. 5 and in 604 of FIG. 6); and/or the like.

A WTRU may measure beam quality (e.g., L1-RSRP, RSRP, signal to noise and interference ratio (SINR), L1-SINR) of one or more beam reference signals associated with configured CORESETs (e.g., CORESET, CORESET_PSS, and/or CORESET_ON). The measurement of one or more beams configured for monitoring a PDCCH (e.g., CORSET_ON) may be performed at a certain time (e.g., during DRX-ON). A beam reference signal may include one or more of SSB, CSI-RS, non-zero power (NZP)-CSI-RS, DM-RS of PDCCH, and/or DM-RS of PDSCH. As described herein, a respective quality of each beam in the first set of beams (e.g., a set of beams configured for WUS monitoring) may be determined during a first time period, and the quality of a beam that is in the second set of beams (e.g., a set of beams configured for monitoring a PDCCH) and not in the first set of beams may be determined during a second time period. The second time period (e.g., DRX-ON) may be subsequent to the first time period (e.g., DRX-OFF). In some examples as described herein, the second time period may overlap the first time period, for example, when the respective quality of each beam in the first set of beams (e.g., a set of beams configured for WUS monitoring) is determined during DRX-ON.

A WTRU may determine that a beam may have failed, for example, if one or more beam measurement qualities are below associated thresholds (e.g., as shown in 504 of FIG. 5). For example, a WTRU may determine a beam failure of WUS if all beams associated with WUS have failed (e.g., as shown in 604 of FIG. 6). The beams associated with a WUS may be a subset of beams associated with configured CORESETs. The beams associated with a WUS may be a first subset of beams associated with the configured CORESETs, and the beams that are not associated with the WUS may be a second subset of beams associated with the configured CORESETs. The first subset of beams and the second subset of beams may not overlap. A beam failure of a WUS may be different from a beam failure of a link between a gNB and a WTRU. In an example, a WUS beam failure may be declared, while the beam quality of a link between a gNB and a WTRU may remain functional (e.g., without beam failure). A beam failure of WUS may be referred to as BF-WUS. A beam failure of a gNB and WTRU radio link may be referred to as BF-RL. Different thresholds may be used to determine BF-WUS and BF-radio link (RL). In an example, a first threshold may be used to determine BF-WUS and a second threshold may be used to determine BF-RL. The first and second thresholds may be different. In examples, the first threshold may be lower than the second threshold, or vice versa.

In an example, a WTRU may skip decoding a WUS and monitor search spaces configured in ON-duration, for example, based on one or more of following: a WTRU declares/declared BF-WUS and/or BF-RL; the beam(s) for WUS is(are) not the same as the beam(s) used for search spaces to be monitored in the associated ON-duration; a WTRU monitors an indication (e.g., SearchSpaceBFR); a WUS is not detected M consecutive times; and/or the like. The indication SearchSpaceBFR may indicate a search space used when the WTRU declares BF-RL and reports a different candidate beam(s) for beam failure recovery.

A WTRU may skip decoding WUS and monitor search spaces configured in ON-duration, for example, if the WTRU declared BF-WUS and/or BF-RL.

A WTRU may skip decoding WUS and monitor search spaces configured in ON-duration, for example, if the beam(s) for WUS is(are) not the same as the beam(s) used for search spaces to be monitored in the associated ON-duration.

A WTRU may skip decoding WUS and monitor search spaces configured in ON-duration, for example, if the WTRU monitors an indication (e.g., SearchSpaceBFR), which may indicate the search space the WTRU monitors if the WTRU declares BF-RL and reports a different candidate beam based on detection of a beam failure.

A WTRU may skip decoding WUS and monitor search spaces configured in ON-duration, for example, if a WUS is not detected M consecutive times. M may be determined, for example, based one or more of following: a predefined number (e.g., M=4); a configured number (e.g., via a higher layer signaling); a number determined based on one or more of the number of beams used, DRX cycle, etc.; and/or the like.

A WTRU may send a message (e.g., a reconfiguration message to reconfigure a set of beams) that indicates a selected (e.g., preferred beam) for BFR to a gNB (e.g., as shown in 510 of FIG. 5). In an example, a WTRU may send (e.g., to a network) a request for beam recovery of a WUS, for example, if the WTRU detects BF-WUS (e.g., as shown in 608 of FIG. 6). A WTRU may send a request to a gNB, for example, for a preferred beam for WUS (e.g., as shown in 608 of FIG. 6). A preferred beam for WUS may be different from the beam(s) used for CORESET_ONs. A preferred beam for a WUS may be indicated, for example, via a scheduling request (SR) and/or a buffer status report (BSR). A preferred beam for a WUS may be selected (e.g., as shown in 508 of FIG. 5 or as shown in 606 of FIG. 6) and/or indicated (for example, via SR and/or BSR) by a WTRU to a gNB. The preferred beam may be identified, e.g., by determining a beam that has a beam quality that is greater than a predetermined quality value (e.g., as shown in 506 of FIG. 5). The preferred beam may be in a different set of beams from the beam that has failed. For example, the preferred beam may be in a first set of beams and the beam that has failed may be in a second set of beams. The first set of beams and the second set of beams may differ. The first set of beams and the second set of beams may or may not overlap. One or more SR resources (e.g., or PUCCH resources) may be reserved for a WTRU. A (e.g., each) SR resource and/or PUCCH resource may be associated with a beam (e.g., a TCI state and/or a QCL-typeD). A WTRU may send an SR resource, which may be associated with a preferred beam determined by the WTRU. A preferred beam indication may be performed with one or more types of physical uplink channel. For example, a first uplink channel may be a physical uplink control channel (PUCCH) and a second uplink channel may be physical random access channel (PRACH). In an example, a type of physical uplink channel may be determined based on a beam failure type. For example, PRACH may be used to indicate a preferred beam if a WTRU declared BF-RL, and PUCCH may be used to indicate a preferred beam if the WTRU declared BF-WUS. Preferred beams may be used interchangeably with different or updated candidate beams. A gNB may confirm the reception of a beam change request for WUS, and/or the WTRU may start monitoring WUS with the preferred beam reported (e.g., by receiving a message as shown in 512 of FIG. 5). A WTRU may ignore (or skip decoding) a WUS, for example, if the WTRU is in a beam recovery procedure.

A WUS may be used to indicate cross-slot scheduling. In an example, a PSS may include additional information for a WTRU. A PSS may indicate to a WTRU, for example, if the WTRU implements (e.g., whether the WTRU must implement) cross-slot scheduling. For example, a PSS may indicate to a WTRU if the WTRU implements cross-slot scheduling in upcoming associated active time(s). The PSS may indicate to the WTRU if the WTRU switches (e.g., whether the WTRU must switch) to another bandwidth part. For example, a PSS may indicate to a WTRU if the WTRU switches to another bandwidth part other than the BWP on which the PSS is being transmitted.

A PSS may be transmitted as a wake-up signal. A PSS may be transmitted during an active time (referred to as active-time PSS). A PSS transmitted during an active time may indicate to a WTRU certain information. For example, a PSS transmitted during active time may (e.g., dynamically) indicate to a WTRU to switch between cross-slot scheduling and same-slot scheduling. Same-slot and cross-slot scheduling may be used, for example, in same-slot scheduling. A PSS transmitted during active time may use a different DCI format. A PSS transmitted during active time may use a currently used DCI format, for example, by adding different bits to the DCI. A PSS transmitted during active time may use one or more (e.g., different) DCI formats, for example, by adding bits or re-purposing one or more bits in a first DCI format (e.g., by configuring bits to indicate power saving techniques). In examples, a DCI with PSS bits may be monitored by the WTRU with a specified periodicity.

A WUS PSS and an active-time PSS may be used to configure a power saving scheme. For example, a WUS PSS and an active-time PSS may be used to configure the same power saving scheme. In an example, a WUS PSS may indicate to a WTRU to perform cross-slot scheduling in an associated active time. The active-time PSS may be used (e.g., during the active time) to dynamically switch the WTRU between same-slot and cross-slot scheduling. Configuring same-slot or cross-slot scheduling may be achieved, for example, by setting the minimum value of the k0 and/or the k2 parameters (e.g., to 0 slots, or to at least 1 slot, respectively).

In an example, a WUS PSS may indicate to a WTRU to use cross-slot scheduling (e.g., by setting k0min (k2min) to at least 1 slot). For example, the WTRU may receive (e.g., in a data scheduling DCI), a resource allocation with k0 equal to zero slots. For example, the resource allocation may be by a DCI codepoint indicating an entry in the time division relay access (TDRA) table. The WTRU may, for example, revert to same-slot scheduling (e.g., set k0min and k2min to 0 slots). The WTRU may set k0min and k2min to 0 slots in slot n, for example, if the scheduling DCI with the k0=0 indication is received in slot n.

In an example, a WUS PSS may indicate to the WTRU to use cross-slot scheduling (e.g., by setting k0min (k2min) to at least 1 slot). For example, the WTRU may receive (e.g., in a data scheduling DCI), a resource allocation with k2 equal to zero slots. For example, the resource allocation may be by a DCI codepoint indicating an entry in the time division relay access (TDRA) table. The WTRU may, for example, revert to same-slot scheduling (e.g., set k0min and k2min to 0 slots). The WTRU may set k0min and k2min to 0 slots in slot n, for example, if the scheduling DCI with the k2=0 indication is received in slot n.

In an example, a WUS PSS may indicate to the WTRU to use cross-slot scheduling (e.g., by setting k0min (k2min) to at least 1 slot). For example, the WTRU may receive (e.g., in a data scheduling DCI), an aperiodic CSI-RS triggering indication with the triggering offset indicated to be 0 slots. The WTRU may, for example, revert to same-slot scheduling (e.g., set k0min and k2min to 0 slots). The WTRU may set k0min and k2min to 0 slots in slot n, for example, if the scheduling DCI with the aperiodic CSI-RS triggering offset=0 indication is received in slot n.

In one or more examples, the minimum aperiodic CSI-RS triggering offset may be set to 0 slots, for example, if the WTRU is in same-slot scheduling mode. The minimum aperiodic CSI-RS triggering offset may be set to be equal to k0min, for example, if the WTRU is in cross-slot scheduling mode.

In an example, a WUS PSS may (e.g., always) be transmitted before an (e.g., each) active time associated with the WUS PSS. A WUS PSS may include a bit field to indicate to a WTRU whether to wake-up. A WTRU may (e.g., if the WTRU does not detect a WUS PSS) wake-up. A WTRU may determine that same-slot scheduling may be used in an upcoming associated active time. For example, if the WTRU does not detect the WUS PSS, the WTRU may wake-up, determine that same-slot scheduling may be used in the upcoming associated active time, and/or may set one or more of k0min, k2min, and/or the minimum aperiodic CSI-RS triggering offset to 0 slots.

A configuration of a WUS PSS may indicate a configuration (e.g., DCI format) of an active-time PSS. For example, a WUS PSS may be configured with a bit field to activate/deactivate cross-slot scheduling. An active-time PSS may be configured to have a bit field to activate/deactivate cross-slot scheduling. A WUS PSS may be configured without a bit field to activate/deactivate cross-slot scheduling. An active-time PSS may be configured without a bit field to activate/deactivate cross-slot scheduling.

A WTRU may indicate (e.g., explicitly) to a gNB that the WTRU was unable to monitor for a WUS. A WTRU may (e.g., explicitly) indicate to a gNB that the WTRU was unable to monitor for a WUS, for example, if the WUS contains additional information. A WTRU may (e.g., explicitly) indicate to a gNB that the WTRU was unable to monitor for a WUS, for example, via a RACH or an SR. The additional information may include, for example, k0/k2 values for cross-slot scheduling and/or BWP switching.

A network may indicate missing values to a WTRU, for example, in a corresponding on duration. A network may indicate missing values to a WTRU in a corresponding on duration (e.g., via DCI), for example, if the network is able to anticipate that a WTRU is unable to monitor a WUS. A network may anticipate that a WTRU is unable to monitor a WUS, for example, if the network is aware that no current search space configurations map to the WTRU for a given on duration. A WTRU may be unable to detect a WUS. A WTRU may (e.g., if the WTRU was unable to detect the WUS) wake up for a corresponding on duration and monitor the PDCCH of the corresponding on duration (e.g., using one or more of the PS-RNTI, group power saving RNTI, or a dedicated C-RNTI).

A WTRU may monitor one or more (e.g., some or all) short DRX cycles, for example, if PSS WUS is not configured for a WTRU. A WTRU may receive relevant PSS information, for example, via a MAC CE, (e.g., a short DRX MAC CE).

A TCI state of a WUS may be (e.g., dynamically) indicated. In an example, a WUS may be configured by an RRC.

A WUS may be activated and/or deactivated with MAC CE signalling, for example, within an active time. Deactivation may be based on the expiry of a timer. A MAC CE that may be used to activate a WUS may provide other information (e.g., active TCI state(s) for the CORESET(s) used for a WUS).

A MAC CE may be used to activate TCI state(s) for the CORESET(s) used for a WUS. A WTRU may determine that a WUS is activated, for example, if a TCI state activation command is received. A WUS may be deactivated, for example, by the expiry of a timer. A timer may be reset, for example, if a different MAC CE is received.

In an example, the presence and/or configuration of a WUS (e.g., indicating WTRU specific or group common, DCI format and contents, etc.) may be determined, for example, by a DRX cycle. For example, a WUS may be activated for a short DRX cycle, but not for a long DRX cycle, or vice versa.

A WTRU may be configured to operate in a cross-slot scheduling mode. A WTRU may be configured to operate according to a power saving state. In examples, a WTRU may be configured to operate according to one of multiple (e.g., a set of) power saving states. In an example, a WTRU may operate in cross-scheduling mode, for example, where the minimum value of k0 and k2 parameters may be set such that certain entries of the PDSCH and/or PUSCH TDRA tables configured by the RRC may not be used for data scheduling. The certain entries may include the entries associated with k0 or k2 parameters that may be smaller than the minimum value. An entry of a TDRA table may indicate that the table or entry may not be used for data scheduling. A WTRU (e.g., based on the entry) may not expect to receive a grant or assignment in the DCI indicating the entry of the TDRA table that has a k0 or k2 smaller than the configured minimum value.

A power saving state may indicate that certain entries of a TDRA table are excluded. In an example, a power saving state may indicate that certain entries of a TDRA table are excluded (e.g., by setting minimum k0/k2 values). A normal power state may indicate that some or all entries of a TDRA table are useable. In an example, a normal power state may indicate that one or more (e.g., all) entries of a TDRA table are useable without restriction.

A power saving state may be set according to an attribute of at least one of a long and a short DRX. For example, a minimum value of the k0 and/or k2 parameters may be set according to an attribute of at least one of a long and a short DRX.

A WTRU may monitor a PDCCH, for example, when in active time. The active time of a WTRU may include the time when one or more timers (e.g., drx-onDurationTimer, drx-InactivityTimer, drx-RetransmissionTimerDL, drx-RetransmissionTimerUL, or ra-ContentionResolutionTimer) are running.

Minimum values for multiple parameters (e.g., k0 and k2) may be signaled together (e.g., jointly). In an example, there may be two minimum values, e.g., for k0min and k2min. The two values may be signaled jointly, for example, using a 1-bit indication in a DCI (e.g., DCI 1_1 or DCI 0_1). For example, as shown in Table 1, bit 0 in the DCI may indicate setting the minimum k0 and k2 values to $k0_1$, $k2_1$, respectively, and bit 1 in the DCI may indicate setting the minimum k0 and k2 values to $k0_2$, $k2_2$, respectively.

TABLE 1

Example of signaling k0 min/k2 min values

| DCI bit | Minimum values of k0 and k2 indicated |
|---------|---------------------------------------|
| bit 0   | $k0_1, k2_1$                          |
| bit 1   | $k0_2, k2_2$                          |

Minimum values for parameters k0 and k2 may be configured by RRC and/or determined by a WTRU. In an example, the $k0_1$, $k2_1$, $k0_2$, $k2_2$ values may be configured by RRC and/or determined by a WTRU.

An RRC may configure one or both $k0_1$, $k0_2$. In an example, a WTRU may (e.g., if only one value is configured) assume that the other (e.g., unconfigured) value represents no restriction in the TDRA table.

An RRC may configure one or both $k2_1$, $k2_2$. In an example, a WTRU may (e.g., if only one value is configured) assume that the other (e.g., unconfigured) value represents no restriction in the TDRA table.

A WTRU may set the minimum values of k0 and k2 to a certain pair. In an example, a WTRU may set the minimum values of k0 and k2 to one of the pairs (a, $k2_1$) or ($k0_2$, $k2_2$). The pair may be configured or based on a rule. The rule may be configured or defined.

A WTRU may set the minimum values of k0 and k2 to a certain pair, for example, based on one or more conditions. In an example (e.g., based on one or more conditions described herein), a WTRU may set the minimum values of k0 and k2 to one of the pairs ($k0_1$, $k2_1$) or ($k0_2$, $k2_2$), where the pair may be configured or based on a rule. For example, the pair may be a pair that results in a restriction to the TDRA tables. For example, the pair may be a pair indexed with a certain index such as the lowest index (e.g., bit 0). For example, the pair may be a pair indexed with the largest index (e.g., bit 1). For example, the pair may be a pair that may enable the WTRU to perform power saving (e.g., by entering a power saving state).

The conditions (e.g., to set minimum values of K0 and k2 to a pair) may include, for example, if one or more (e.g., a combination or a subset, such as some or all) of the following timers are not running or have expired: drx-InactivityTimer, drx-RetransmissionTimerDL, drx-RetransmissionTimerUL, ra-ContentionResolutionTimer, drx-HARQ-RTT-TimerDL, drx-HARQ-RTT-TimerUL, and the drx-onDurationTimer is not running.

The conditions (e.g., to set minimum values of K0 and k2 to a pair) may include, for example, if one or more (e.g., a combination or a subset, such as some or all) of the following timers are not running or have expired: drx-InactivityTimer, drx-RetransmissionTimerDL, drx-RetransmissionTimerUL, ra-ContentionResolution Timer, drx-HARQ-RTT-TimerDL, drx-HARQ-RTT-TimerUL, The conditions (e.g., to set minimum values of K0 and k2 to a pair) may include, for example, if the WTRU is not in active time.

The conditions (e.g., to set minimum values of K0 and k2 to a pair) may include, for example, if the WTRU is not in active time, and the timers (drx-HARQ-RTT-TimerDL and drx-HARQ-RTT-TimerUL) are not running or have expired.

One or more examples (e.g., based on one or more conditions), may be applicable for long and/or short DRX cycles (e.g., both long and short DRX cycles, only long DRX cycles, and so on).

A WTRU may set the minimum values of k0 and k2 to a certain pair, for example, if the WTRU switches to a different BWP. A WTRU may set the minimum values of k0 and k2 to one of the pairs ($k0_1$, $k2_1$) or ($k0_2$, $k2_2$), for example, if the WTRU switches to a different BWP. A pair may be configured or based on a rule. A rule may be configured or defined. For example, a pair may be the pair that results in a restriction to the TDRA tables. A pair may be the pair indexed with a certain index such as the lowest index (e.g., bit 0). A pair may be the pair indexed with the largest index (e.g., bit 1). A pair may be the pair that would enable the WTRU to perform power saving (e.g., by entering a power saving state).

MIMO adaptation may be performed based on BWP (e.g., per BWP). Antenna ports used for data transmission (e.g., in NR DL) may be signaled, for example, in DCI Format 1_1 with a bit field of length 4, 5, or 6 bits. The length of the bit field (bitwidth) may be configured, for example, by the RRC (e.g., via a RRC configuration message). For example, the length of the bit field (bitwidth) may be configured, for example, by an RRC through DM-RS configuration parameters (e.g., dmrs-Type and maxLength), as shown in Table 2. A separate table may be used for PDSCH mapping types A and B. In an example, a table may be specified for a (e.g., each) pair of DM-RS parameters. The DCI bits may indicate a row in a corresponding table. The row may contain the indices of the antenna ports and/or other relevant parameters.

TABLE 2

Example of antenna ports bitwidth determination

| dmrs-Type | maxLength | DCI bit field length |
|-----------|-----------|----------------------|
| 1         | 1         | 4                    |
| 1         | 2         | 5                    |
| 2         | 1         | 5                    |
| 2         | 2         | 6                    |

In some examples, the number of antenna ports may be the same for some or all BWPs. The number of antenna ports may be different for some or all BWPs. For example, the number of antenna ports may be determined per BWP. The number of bits used in an antenna ports field of a DCI may be different (e.g., 4, 5, or 6 bits), for example, if the number of antenna ports is determined per BWP.

The size of an "antenna ports" bitfield may be determined, for example, as the maximum number of a DCI bit field length. In an example, the size of an "antenna ports" bitfield may be determined, for example, as the maximum number of a DCI bit field length over all configured BWPs, e.g., as shown in Formula 1:

$$\text{bitwidth: } \max_i(\max(X_A^i, X_B^i)) \quad \text{Formula 1}$$

As shown in Formula 1, i may be a BWP index. $X_A^i$ may be the Antenna ports bitwidth, which may be derived according to dmrs-DownlinkForPDSCH-MappingTypeA for BWP i. $X_B$ may be the antenna ports bitwidth, which may be derived according to dmrs-DownlinkForPDSCH-MappingTypeB for BWP i. For a given BWP i, $X_A^i$ may be used as zero in Formula 1, for example, if the WTRU is not configured with dmrs-DownlinkForPDSCH-MappingTypeA. For a given BWP i, $X_B^i$ may be used as zero in Formula 1, for example, if the WTRU is not configured with dmrs-DownlinkForPDSCH-MappingTypeB.

Zeros may be padded, for example, if the number of antenna ports in a BWP is smaller than the bitwidth. In an example, (bitwidth-k) zeros may be padded to the MSB of the bitwidth, for example, if the number of antenna ports k in BWP i is smaller than the bitwidth.

The number of active RF chains used for a (e.g., one) BWP may be different than the number of RF chains for another BWP. BWP switching may take a certain amount of time to complete. In an example (e.g., if the number of antenna ports are determined per BWP), the number of active RF chains used for a BWP may be different than the number of RF chains for another BWP. In examples, more RF chains may be used to support more antenna ports. For example, four (4) or more RF chains may be used to support four (4) antenna ports, while two (2) or more RF chains may be used to support (2) antenna ports.

In an example, the time used to switch BWP may be determined based on one or more of the following. t may denote the time (e.g., in ms, slots, or OFDM symbols) used to switch from a current BWP to a target BWP, for example, if the target and current BWPs are configured with the same number of antenna ports. For example, t may have the same values as defined in NR.

The time used to switch BWP may be t+offset1, for example, if the target BWP is configured with more antenna ports than the current BWP. The value of the offset1 (e.g., the additional time) may depend, for example, on the absolute values of the antenna ports on the target and/or the current BWP. The value of the offset1 (e.g., the additional time) may depend on the difference between the number of antenna ports configured for the target and the current BWP. The value of the offset1 (e.g., the additional time) may be a fixed value that may depend on a parameter other than the number of antenna ports of the target and the current BWP. For example, the offset1 value may be based on (e.g., at least) the subcarrier spacing of the target BWP.

The time used to switch may bet, for example, if the target BWP is configured with fewer antenna ports than the current BWP. Turning off some of the RF chains may not need additional time. The time used to switch may be t+offset2. The offset2 (e.g., the additional time) value may be fixed and/or may depend on, for example, (e.g., at least) the subcarrier spacing of the target BWP. In an example, the additional time used to switch from BWP i to BWP j may be the same as the additional time used to switch from BWP j to BWP i.

One or more power saving signal(s)/wake-up signal(s) offset(s) may be configured (e.g., for short DRX). An (e.g., implicit) offset indication may be associated with a search space configuration.

In examples, a WTRU may monitor for a PSS WUS for short DRX cycles in a configured search space. A search space may be (e.g., implicitly) selected, for example, based on parameters of a short DRX cycle, e.g. when the short DRX cycle begins the DRX short cycle duration.

In examples, a network may indicate a range of occasions (e.g. in time and/or frequency) where a monitoring occasion may occur. A WTRU may observe a current search space configuration and/or may monitor for a PSS WUS, for example, if a search space monitoring occasion falls within the range.

A DRX offset range and/or mapping between PSS WUS search space monitoring and DRX parameters may be configured (e.g., semi-statically) and/or dynamically updated. A DRX offset range and/or mapping between PSS WUS search space monitoring and DRX parameters may be configured, for example, via one or more of the following: DRX configuration, DCI, and/or RRC signaling.

A WTRU may be configured with a number of possible search spaces. A WTRU may be configured with a mapping between PSS WUS search space monitoring occasions and the beginning of a short DRX. A WTRU may (e.g., upon entering short DRX) select between search spaces based on, for example, the slot in which short DRX begins. A WTRU may monitor for a PSS WUS in a subspace for a corresponding on duration.

A WTRU may be provided with a range of possible time-frequency resources (e.g. during a DRX configuration) in which to monitor for the PSS WUS. A WTRU may select its current search space configurations or a search space which fulfills the range. A WTRU may monitor in more than one search space, for example, if multiple search spaces are valid (e.g., fall within an indicated range). A WTRU may select among multiple search spaces (e.g., based on predefined criteria), for example, if more than one search space is valid.

A WTRU may be provided an offset and/or a range of possible time-frequency resources to monitor for a PSS WUS. In an example, a WTRU may switch between several search spaces on subsequent monitoring occasions to fulfill a range, for example, if a search space does not satisfy an indicated range. A search space may not satisfy an indicated range, for example, if a periodicity of a search space is not aligned with a DRX cycle. For example, an offset between a search space and the on duration may not be fixed. A WTRU may switch between several search spaces on subsequent monitoring occasions to fulfill a range.

A separate search space may be associated with a short DRX cycle. A WTRU may monitor the separate search space for WUS. The parameters of the search space may be used to indicate to the WTRU when to monitor the WUS. The parameters of the search space may include, for example, the monitoring periodicity and slot offset, monitoring symbols within a slot, and/or the like. In an example, the DRX ON duration for a short cycle may start every 23 ms (e.g., drx-ShortCycle=20 ms, drx-StartOffset=3 ms). The monitoringSlotPeriodicityAndOffset parameter of the search space may be configured, for example, so that the WTRU may start monitoring the WUS every 23 ms–WUS-Offset. Parameters of the search space may be configured, for example, as shown in Eq. 1 and Eq. 2:

$$\text{WUSmonitoringSlotPeriodicity=drx-ShortCycle} \qquad \text{Eq. 1}$$

$$\text{WUSmonitoringSlotOffset=drx-StartOffset–WUS-offset} \qquad \text{Eq. 2}$$

A WTRU may monitor the search space associated with a short DRX cycle, for example, if the drx-ShortCyleTimer is running. A WTRU may not (e.g., be expected to) monitor the search space associated with a short DRX cycle, for example, if the drx-ShortCyleTimer is not running.

A search space may be associated with both long DRX and short DRX. A search space may include parameters defining the monitoring occasions associated with long and/or short DRX. For example, parameter WUSmonitoringSlotPeriodicity for long DRX may be a multiple of a parameter for a short DRX. A WTRU may monitor the search space associated with the short DRX, for example, if the drx-ShortCyleTimer is running. A WTRU may not be expected to monitor the search space associated with a short DRX cycle, for example, if the drx-ShortCyleTimer is not running.

A WTRU may not monitor the WUS search space associated with a long DRX cycle, for example, if a drxShortCyleTimer is running.

An offset configuration may be explicit. An indicated offset may be the same for short and long DRX cycles. A WTRU may assume that an offset is a default value that applies to short and long DRX cycles for example, if (e.g., only) one value of an offset is indicated to the WTRU.

A PSS WUS offset value may be independently configured for short and long DRX cycles, respectively. Offset values may be, for example, semi-statically configured. Offset values may be, for example, dynamically configured.

Multiple offsets may be indicated to a WTRU. A WTRU may monitor in valid offset occasions. In an example, a WTRU may (e.g., only) monitor in valid offset occasions, for example, depending on one or more short DRX cycle conditions. Short DRX cycle conditions may include, for example, if the WTRU begins a short DRX cycle, the length of a short cycle, and/or the like. Valid offset occasions may include, for example, the offset(s) that fall within the short DRX cycle, the offset(s) that satisfy a minimum time before the beginning of the on duration, and/or offsets that fall within configured search spaces. Selection of monitoring occasions may be performed autonomously (e.g., by a WTRU). Selection of a monitoring occasion may be based on criteria (e.g., defined by a network).

A DRX offset may be configured (e.g., semi-statically) and/or dynamically updated. A DRX offset may be configured, for example, via one or more of the following: DRX configuration, DCI, and/or RRC signaling.

A WTRU may (e.g., autonomously) select which short DRX offset to monitor. In an example, a WTRU may be provided with a PSS WUS monitoring offset (e.g., during an initial DRX configuration) for a long DRX, and several possible monitoring offsets for a short DRX. The WTRU may (e.g., autonomously) select which short DRX offset to monitor, for example, depending on when the WTRU enters a short DRX. The selection of a short DRX monitoring occasion may be subject to rules (e.g., defined by a network).

A WTRU may be provided with a default offset value during an initial DRX configuration. A default offset value may apply to a long and short DRX. A network may send a revised offset for a short or long DRX. For example, a network may (e.g., at some point) send (e.g., via DCI or dedicated RRC signaling) a revised offset for short or long DRX. The WTRU may apply the offset, for example, after a predefined time (e.g., the next DRX monitoring occasion).

A WTRU may be configured to ignore WUS, for example, for a short DRX cycle. A WTRU may ignore a PSS WUS and wake up during a corresponding on duration, or the WTRU may remain asleep. In some examples, a WTRU may not (e.g., be able to) fulfill one or more monitoring criteria. In various examples, a short DRX cycle may be shorter than a monitoring offset, and/or a cycle duration may not be sufficient for a WTRU to complete WUS monitoring; a mapping between a short cycle start and a current search space configuration may not be available; a current search space configuration may not fall within an indicated range; and/or the like. A WTRU may (e.g., if the WTRU is not able to fulfill the monitoring criteria) ignore a PSS WUS and wake up during a corresponding on duration, or the WTRU may remain asleep.

A WTRU may (e.g., be expected to) monitor a search space, for example, if a threshold(s) for DRX cycle(s) is met. In an example, a WTRU may (e.g., be expected to) monitor a search space, for example, (e.g., only) if parameter drx-ShortCycle is larger than a first threshold and/or if parameter drx-LongCycle is larger than a second threshold. A WTRU may not (e.g., be expected to) monitor an associated search space for a WUS, for example, if a cycle is less than a corresponding threshold. A WTRU may (e.g., if a cycle is less than a corresponding threshold) wake-up or sleep during the corresponding ON duration. Whether to wake-up or sleep may be configured or defined, for example, as a rule. The thresholds (e.g., including the first threshold and the second threshold) may be configured.

A WTRU may skip a long DRX ON duration. A WTRU may skip a long DRX ON duration and/or may continue to monitor according to a corresponding short cycle monitoring configuration, for example, if the short DRX cycle timer is running when a long DRX ON duration arrives.

A WTRU may monitor or ignore PSS WUS for a short DRX cycle, for example, depending on whether certain criteria are satisfied. In an example, a WTRU may be provided with independent PSS WUS monitoring occasions for short and long DRX values. A WTRU may (e.g., upon entering a short DRX) monitor for the short DRX PSS WUS occasion subject to the offset, for example, (e.g., only) if it satisfies certain criteria. The criteria may be pre-determined. The pre-determined criteria may include one or more of a minimum processing time, a DRX cycle duration, and/or the like. The WTRU may monitor a PSS WUS for a short DRX cycle, for example, if the criteria are satisfied. The WTRU may ignore the PSS WUS, for example, if the criteria are not satisfied. The WTRU may wake up and monitor the corresponding on duration, or ignore the on duration and remain asleep, for example, if the WTRU ignores the WUS.

A WTRU may apply the offset indicated for long-DRX, for example, if no pre-configured search space fulfills the indicated offset or range of time-frequency resources. The WTRU may not monitor the WUS, and may either wake up and monitor the corresponding on duration, or remain asleep.

FIG. 5 illustrates an example for performing beam failure detection and recovery. Examples disclosed herein and other examples may operate in accordance with example 500 shown in FIG. 5. Performing beam failure detection and recovery may comprise 502 through 512. In 502, a first set of beams and a second set of beams may be determined. In 504, a respective quality of each beam in the first set of beams may be determined to have less than a predetermined quality value. In 506, a beam that is in the second set of beams and not in the first set of beams may be determined to have a quality that is equal to or greater than the predetermined quality value. In 508, the beam that is in the second set of beams and not in the first set of beams and whose quality is equal to or greater than the predetermined quality value may be selected for a beam failure recovery (BFR). In 510, a message that indicates the selected beam for the BFR may be sent to a gNodeB (gNB). In 512, a message comprising the selected beam may be received from the gNB.

FIG. 6 illustrates an example for performing beam failure detection and recovery for WUS monitoring. Examples disclosed herein and other examples may operate in accordance with example 600 shown in FIG. 6. Performing beam failure detection and recovery for WUS monitoring may comprise 602 through 608. In 602, wake-up signal (WUS) monitoring may be performed using a subset of beams in a set of beams used for monitoring a physical downlink control channel (PDCCH). In 604, a beam failure for the WUS monitoring (BF-WUS) may be detected based on a failure of all beams in the subset of beams. In 606, at least one beam in the set of beams and not in the subset of beams may be identified as at least one preferred beam for WUS beam failure recovery (BFR). In 608, the WUS BFR may be requested by informing a network node about the BF-WUS and by indicating the at least one preferred beam for the WUS BFR.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a processor configured to:
determine a first set of beams associated with monitoring for a physical downlink control channel transmission;
determine a second set of beams associated with monitoring for a type of signal, wherein the second set of beams is a subset of the first set of beams;
determine that:
a respective quality of each beam in the second set of beams is less than a predetermined quality value, and
a beam that is in the first set of beams and not in the second set of beams has a quality that is equal to or greater than the predetermined quality value;
select the beam that is in the first set of beams and not in the second set of beams and whose quality is equal to or greater than the predetermined quality value, for a beam failure recovery (BFR);
monitor for a wake-up signal (WUS) using the second set of beams before a discontinuous reception (DRX)-on;
monitor the physical downlink control channel transmission during the DRX-on using the first set of beams, wherein the BFR comprises a WUS-BFR;
perform the WUS-BFR by skipping decoding of the WUS; and
monitor for the WUS using the selected beam based on a message received from a base station.

2. The WTRU of claim 1, wherein the processor is configured to:
send a first message that indicates the selected beam for the BFR; and
receive a second message that indicates the selected beam.

3. The WTRU of claim 2, wherein the first message is sent to a base station, and the second message is received from the base station.

4. The WTRU of claim 1, wherein the processor is configured to receive a reconfiguration message that indicates a third set of beams associated with monitoring for the type of signal, wherein the third set of beams is different from the second set of beams.

5. The WTRU of claim 1, wherein the processor is configured to receive a reconfiguration message, wherein the reconfiguration message indicates that the selected beam is to be included in the second set of beams.

6. The WTRU of claim 1, wherein the respective quality of each beam in the second set of beams is determined during a first time period, and the quality of the beam that is in the first set of beams and not in the second set of beams is determined during a second time period, wherein the second time period is subsequent to the first time period.

7. The WTRU of claim 1, wherein the respective quality of each beam in the second set of beams is determined during a first time period, and the quality of the beam that is in the first set of beams and not in the second set of beams is determined during a second time period, wherein the first time period and the second time period overlap in time.

8. The WTRU of claim 1, wherein the processor is configured to:
monitor the second set of beams for the type of signal, and the BFR is for a beam failure in association with monitoring for the type of signal, wherein the beam failure differs from a radio link failure associated with using the second set of beams.

9. A method comprising:
determining a first set of beams associated with monitoring for a physical downlink control channel transmission;
determining a second set of beams associated with monitoring for a type of signal, wherein the second set of beams is a subset of the first set of beams;
determining that:
a respective quality of each beam in the second set of beams is less than a predetermined quality value, and
a beam that is in the first set of beams and not in the second set of beams has a quality that is equal to or greater than the predetermined quality value;
selecting the beam that is in the first set of beams and not in the second set of beams and whose quality is equal to or greater than the predetermined quality value, for a beam failure recovery (BFR);
monitoring for a wake-up signal (WUS) using the second set of beams before a discontinuous reception (DRX)-on;
monitoring the physical downlink control channel transmission during the DRX-on using the first set of beams, wherein the BFR comprises a WUS-BFR;
performing the WUS-BFR by skipping decoding of the WUS; and
monitoring for the WUS using the selected beam based on a message received from a base station.

10. The method of claim 9, further comprising:
sending a first message that indicates the selected beam for the BFR; and
receiving a second message that indicates the selected beam.

11. The method of claim 10, wherein the first message is sent to a base station, and the second message is received from the base station.

12. The method of claim 9, further comprising receiving a reconfiguration message that indicates a third set of beams associated with monitoring for the type of signal, wherein the third set of beams is different from the second set of beams.

13. The method of claim 9, further comprising receiving a reconfiguration message, wherein the reconfiguration message indicates that the selected beam is to be included in the second set of beams.

14. The method of claim 9, wherein the respective quality of each beam in the second set of beams is determined during a first time period, and the quality of the beam that is in the first set of beams and not in the second set of beams is determined during a second time period, wherein the second time period is subsequent to the first time period.

15. The method of claim 9, wherein the respective quality of each beam in the second set of beams is determined during a first time period, and the quality of the beam that is in the first set of beams and not in the second set of beams is determined during a second time period, wherein the first time period and the second time period overlap in time.

16. The method of claim 9, further comprising monitoring the second set of beams for the type of signal, and the BFR is for a beam failure in association with monitoring for the type of signal, wherein the beam failure differs from a radio link failure associated with using the second set of beams.

17. A non-transitory computer readable medium storing instructions, which, when executed by one or more processors, cause the one or more processors to perform the method of claim 9.

\* \* \* \* \*